(12) United States Patent
Okazaki

(10) Patent No.: US 9,716,389 B2
(45) Date of Patent: Jul. 25, 2017

(54) POWER FEEDING SYSTEM, POWER FEEDING DEVICE, AND POWER FEEDING METHOD

(71) Applicant: SEIKO INSTRUMENTS INC., Chiba-shi, Chiba (JP)

(72) Inventor: Norihiro Okazaki, Chiba (JP)

(73) Assignee: SII Semiconductor Corporation (JP)

(*) Notice: Subject to any disclaimer, the term of this patent is extended or adjusted under 35 U.S.C. 154(b) by 484 days.

(21) Appl. No.: 14/494,667

(22) Filed: Sep. 24, 2014

(65) Prior Publication Data
US 2015/0091387 A1    Apr. 2, 2015

(30) Foreign Application Priority Data
Sep. 27, 2013  (JP) .................. 2013-202497

(51) Int. Cl.
*H02J 5/00*    (2016.01)
*H02J 7/02*    (2016.01)

(52) U.S. Cl.
CPC .............. *H02J 5/005* (2013.01); *H02J 7/025* (2013.01)

(58) Field of Classification Search
CPC ....................................... H02J 5/005

USPC .......................................... 307/104
See application file for complete search history.

(56) References Cited

U.S. PATENT DOCUMENTS

| 2013/0134793 A1* | 5/2013 | Ryu | H02J 17/00 307/104 |
| 2013/0147281 A1* | 6/2013 | Kamata | H02J 17/00 307/104 |

* cited by examiner

*Primary Examiner* — Joseph Chang
(74) *Attorney, Agent, or Firm* — Adams & Wilks

(57) ABSTRACT

A power feeding system (100) includes a power feeding device (1) and a power receiving device (2). The power feeding device (1) includes: a drive transistor (13) connected to a feeding coil (11); a drive signal generation section (30) configured to generate a drive signal for driving the feeding coil (11); a crest value variation detection section (40) configured to detect the change in the resonant state of the resonant circuit (20) as a periodic waveform variation in a voltage excited in the feeding coil (11); and a drive control section (50) configured to determine whether or not electric power is suppliable to the power receiving device (2) based on the periodic waveform variation, and control to whether or not to continuously supply the drive signal to the drive transistor (13) based on a result of the determination.

18 Claims, 16 Drawing Sheets

POWER FEEDING SYSTEM, POWER FEEDING DEVICE, AND POWER FEEDING METHOD

BACKGROUND OF THE INVENTION

1. Field of the Invention

The present invention relates to a power feeding system, a power feeding device, and a power feeding method.

2. Description of the Related Art

In recent years, there has been known a power feeding system for supplying electric power by wireless via electromagnetic induction or electromagnetic coupling between a feeding coil and a receiving coil (see, for example, Japanese Patent Application Laid-open No. 2006-60909). Such power feeding system is used for charging a battery included in a device such as a mobile phone terminal and a personal digital assistant (PDA), for example.

By the way, heat generated when a metallic foreign object is placed on the feeding coil may become a problem. The above-mentioned power feeding system is configured to suppress heat generation caused by the metallic foreign object by detecting the metallic foreign object based on the magnitude of a peak voltage of a voltage of the feeding coil, for example. In the above-mentioned power feeding system, however, it is difficult to accurately detect the metallic foreign object based on the material and thickness of the metallic foreign object, for example. Demands are therefore made on a power feeding system capable of appropriately suppressing heat generation caused by the metallic foreign object.

SUMMARY OF THE INVENTION

The present invention has been made in order to solve the above-mentioned problem, and it is an object thereof to provide a power feeding system, a power feeding device, and a power feeding method capable of suppressing heat generation caused by a metallic foreign object.

In order to solve the above-mentioned problem, according to one embodiment of the present invention, there is provided a power feeding system, including a power feeding device including a feeding coil and a power receiving device including a receiving coil, for supplying electric power from the power feeding device to the power receiving device via electromagnetic induction, the power receiving device including a resonant circuit, the resonant circuit including: the receiving coil to be supplied with electric power from the feeding coil; a resonant capacitor configured to resonate with the receiving coil; and a first switching element configured to change an electrical connection state of the resonant capacitor to control a resonant state of the resonant circuit, the power feeding device including: a second switching element connected in series to the feeding coil; a drive signal generation section configured to generate a drive signal for driving the feeding coil by changing a state of the second switching element between a conductive state and a non-conductive state; a variation detection section configured to detect the change in the resonant state of the resonant circuit, which occurs in accordance with the connection state of the resonant capacitor, as a periodic waveform variation in a voltage excited in the feeding coil; and a drive control section configured to determine whether or not electric power is suppliable to the power receiving device based on the periodic waveform variation detected by the variation detection section, and control whether or not to continuously supply the drive signal to the second switching element based on a result of the determination Further, according to another embodiment of the present invention, in the power feeding system, the drive control section is configured to: supply the drive signal to the second switching element in a predefined first period, to thereby cause the variation detection section to detect the periodic waveform variation; continue, when it is determined in the first period that electric power is suppliable to the power receiving device, the supply of the drive signal to the second switching element in a predefined second period after the predefined first period, to thereby continuously drive the feeding coil; and stop, when it is determined in the first period that electric power is not suppliable to the power receiving device, the supply of the drive signal to the second switching element in the second period, to thereby intermittently drive the feeding coil.

Further, according to another embodiment of the present invention, in the power feeding system, the drive control section includes a timing generation section configured to generate the first period and the second period alternately and regularly.

Further, according to another embodiment of the present invention, in the power feeding system, the second period is defined to be longer than the first period so that an increased temperature of a foreign object caused by heat generation when the feeding coil and the foreign object are electromagnetically coupled to each other becomes a predetermined temperature or less.

Further, according to another embodiment of the present invention, in the power feeding system: the periodic waveform variation includes a variation in peak voltage of the excited voltage; the variation detection section is configured to detect the change in the electrical connection state of the resonant capacitor as the variation in the peak voltage; and the drive control section is configured to determine whether or not electric power is suppliable to the power receiving device based on the variation in the peak voltage detected by the variation detection section.

Further, according to another embodiment of the present invention, in the power feeding system, the variation detection section includes: a peak hold circuit configured to hold the peak voltage of the excited voltage; and a detection circuit configured to detect the variation in the peak voltage based on a voltage held by the peak hold circuit and the peak voltage of the excited voltage.

Further, according to another embodiment of the present invention, in the power feeding system: the periodic waveform variation includes a variation in pulse width of the excited voltage; the variation detection section is configured to detect the change in the electrical connection state of the resonant capacitor as the variation in the pulse width; and the drive control section is configured to determine whether or not electric power is suppliable to the power receiving device based on the variation in the pulse width detected by the variation detection section.

Further, according to another embodiment of the present invention, in the power feeding system, the power receiving device further includes a resonance control section configured to control the first switching element to control the resonant state of the resonant circuit, the resonance control section being configured to control the first switching element in accordance with a current flowing into a battery that is charged with DC electric power obtained by rectifying electric power received by the receiving coil.

Further, according to another embodiment of the present invention, in the power feeding system, the drive signal generation section includes: a first signal generation section configured to generate the drive signal for setting, when the excited voltage falls within a predetermined threshold range, the second switching element to the conductive state in a predefined third period and thereafter setting the second switching element to the non-conductive state; and a second signal generation section configured to generate the drive signal for setting, when the excited voltage becomes out of the predetermined threshold range, the second switching element to the conductive state after a lapse of a predefined fourth period.

Further, according to another embodiment of the present invention, there is provided a power feeding device for a power feeding system, for supplying electric power to a power receiving device via electromagnetic induction, the power receiving device including a resonant circuit, the resonant circuit including: a receiving coil to be supplied with electric power from a feeding coil included in the power feeding device; a resonant capacitor configured to resonate with the receiving coil; and a first switching element configured to change a connection state of the resonant capacitor to control a resonant state of the resonant circuit, the power feeding device including: a second switching element connected in series to the feeding coil; a drive signal generation section configured to generate a drive signal for driving the feeding coil by changing a state of the second switching element between a conductive state and a non-conductive state; a variation detection section configured to detect a change in the resonant state of the resonant circuit, which occurs in accordance with the connection state of the resonant capacitor, as a periodic waveform variation in a voltage excited in the feeding coil; and a drive control section configured to determine whether or not electric power is suppliable to the power receiving device based on the periodic waveform variation detected by the variation detection section, and control whether or not to continuously supply the drive signal to the second switching element based on a result of the determination.

Further, according to another embodiment of the present invention, there is provided a power feeding method for the above-mentioned power feeding system configured to supply electric power from a power feeding device including a feeding coil to a power receiving device including a receiving coil via electromagnetic induction, the power feeding method including: generating, by a drive signal generation section of the power feeding device, a drive signal for driving the feeding coil by changing a state of a second switching element connected in series to the feeding coil between a conductive state and a non-conductive state; varying, by the power receiving device, a resonant state of a resonant circuit, the resonant circuit including the receiving coil to be supplied with electric power from the feeding coil, a resonant capacitor configured to resonate with the receiving coil, and a first switching element configured to change a connection state of the resonant capacitor to control the resonant state of the resonant circuit; detecting, by a variation detection section of the power feeding device, a change in the resonant state of the resonant circuit, which occurs in accordance with the connection state of the resonant capacitor, as a periodic waveform variation in a voltage excited in the feeding coil; and determining, by a drive control section of the power feeding device, whether or not electric power is suppliable to the power receiving device based on the periodic waveform variation detected in the detecting, and controlling, by the drive control section, whether or not to continuously supply the drive signal to the second switching element based on a result of the determination.

According to one embodiment of the present invention, heat generation caused by a metallic foreign object can be suppressed.

DETAILED DESCRIPTION OF THE PREFERRED EMBODIMENTS

Now, a power feeding system according to one embodiment of the present invention is described below with reference to the accompanying drawings.

First Embodiment

Figure 1:
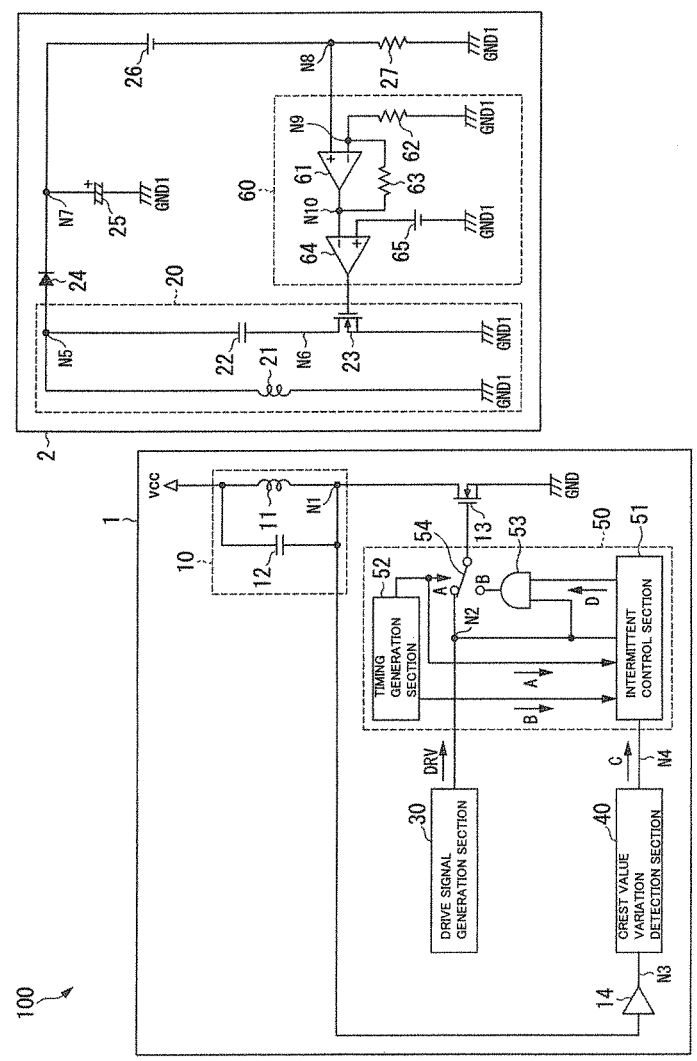
FIG. 1 is a block diagram illustrating an example of a power feeding system according to a first embodiment of the present invention.

FIG. 1 is a block diagram illustrating an example of a power feeding system 100 according to a first embodiment of the present invention.

Referring to FIG. 1, the power feeding system 100 includes a power feeding device 1 and a power receiving device 2.

The power feeding system 100 is a system for supplying electric power from the power feeding device 1 to the power receiving device 2 by wireless (in a contactless manner). For example, the power feeding system 100 supplies electric power for charging a battery 26 included in the power receiving device 2 from the power feeding device 1 to the power receiving device 2. The power receiving device 2 is, for example, electronic equipment such as a mobile phone terminal or a PDA. The power feeding device 1 is, for example, a charger compatible with the power receiving device 2.

<Configuration of Power Feeding Device 1>

The power feeding device 1 includes a feeding coil 11, a resonant capacitor 12, a drive transistor 13, a buffer 14, a drive signal generation section 30, a crest value variation detection section 40, and a drive control section 50.

The feeding coil 11 has a first terminal connected to a power supply VCC and a second terminal connected to a node N1. The feeding coil 11 supplies electric power to a receiving coil 21 included in the power receiving device 2 via, for example, electromagnetic induction or electromagnetic coupling. For charging the battery 26, the feeding coil 11 is arranged to be opposed to the receiving coil 21 to supply electric power to the receiving coil 21 via electromagnetic induction.

The resonant capacitor 12 is connected in parallel to the feeding coil 11, and resonates with the feeding coil 11. The feeding coil 11 and the resonant capacitor 12 construct a resonant circuit 10. The resonant circuit 10 resonates at a given resonant frequency (for example, 100 kHz (kilohertz)) determined by an inductance value of the feeding coil 11 and a capacitance value of the resonant capacitor 12.

The drive transistor 13 (second switching element) is, for example, a field effect transistor (FET transistor), and is connected in series to the resonant circuit 10. In this embodiment, the case where the drive transistor 13 is an N-channel metal oxide semiconductor (MOS) FET is described below as an example. In the following, "MOSFET" is sometimes referred to as a MOS transistor, and "N-channel MOS transistor" is sometimes referred to as an NMOS transistor.

Specifically, the drive transistor 13 has a source terminal connected to a power supply GND, a gate terminal connected to an output signal line of the drive control section 50, and a drain terminal connected to the node N1. The drive transistor 13 periodically repeats an ON state (conductive state) and an OFF state (non-conductive state) under the control of the drive control section 50. In other words, the supply and release of electric power to and from the resonant circuit 10 are repeated by the switching operation of the drive transistor 13. In this manner, a periodic signal is generated in the feeding coil 11, and electric power is supplied from the feeding coil 11 to the receiving coil 21 via electromagnetic induction.

The drive signal generation section 30 generates a drive signal DRV for driving the feeding coil 11. As used herein, the drive signal DRV is a signal for periodically changing the ON state (conductive state) and the OFF state (non-conductive state) of the drive transistor 13. In other words, the drive signal generation section 30 generates the drive signal DRV for periodically controlling the ON state/OFF state of the drive transistor 13.

The buffer 14 is an output circuit for outputting a voltage signal equal to an input signal, and is, for example, a voltage follower circuit. The buffer 14 has an input terminal connected to the node N1 and an output terminal connected to a node N3. In other words, the buffer 14 outputs a voltage of the feeding coil 11 (voltage of the node N1 on the feeding coil 11 side) to the crest value variation detection section 40.

The crest value variation detection section 40 (variation detection section) detects a change in resonant state of a resonant circuit 20 of the power receiving device 2, which occurs in accordance with a connection state of a resonant capacitor 22 of the power receiving device 2 to be described later, as a periodic waveform variation in a voltage excited in the feeding coil 11. Note that, the periodic waveform variation includes a variation in peak voltage of the excited voltage. In this embodiment, a description is given of the case where the crest value variation detection section 40 detects the change in resonant state of the resonant circuit 20 of the power receiving device 2 as the variation in peak voltage of the voltage excited in the feeding coil 11.

Although described in detail later, the power receiving device 2 controls the resonant circuit 20 of the power receiving device 2 to be switched between the resonant state and a non-resonant state in order to charge the battery 26 with a constant current. The periodic waveform of the voltage excited in the feeding coil 11 varies depending on whether or not the resonant circuit 20 of the power receiving device 2 is in the resonant state. Accordingly, the crest value variation detection section 40 detects a change (variation) in peak voltage of the voltage waveform output from the buffer 14, which corresponds to the voltage (excited voltage) of the feeding coil 11, and outputs a result of the detection to a node N4 as a detection signal C. For example, the crest value variation detection section 40 outputs a pulse signal of High state (H state) when the variation in peak voltage of the voltage of the feeding coil 11 is detected. For example, when the variation in peak voltage of the voltage of the feeding coil 11 is not detected, the crest value variation detection section 40 does not output a pulse signal but keeps a Low state (L state). Note that, the detailed configuration of the crest value variation detection section 40 is described later with reference to FIG. 2.

The drive control section 50 performs control to supply the drive signal DRV generated by the drive signal generation section 30 to the drive transistor 13. The drive control section 50 determines based on the variation in peak voltage detected by the crest value variation detection section 40 whether or not electric power can be supplied to the power receiving device 2, and controls whether or not to continue the supply of the drive signal DRV to the drive transistor 13 based on a result of the determination. For example, when it is determined that electric power can be supplied to the power receiving device 2, the drive control section 50 continues the supply of the drive signal DRV to perform continuous drive for continuously driving the feeding coil 11. For example, when it is determined that electric power cannot be supplied to the power receiving device 2, the drive control section 50 stops the supply of the drive signal DRV to perform intermittent drive for intermittently (non-continuously) driving the feeding coil 11. Note that, the state in which electric power cannot be supplied to the power receiving device 2 (power supply impossible state) refers to, for example, the case where there is no power receiving device 2 (including the case where the feeding coil 11 and the receiving coil 21 are not located at appropriate positions) and the case where a metallic foreign object is placed on the feeding coil 11.

Specifically, for example, the drive control section 50 supplies the drive signal DRV to the drive transistor 13 in a predefined detection period (first period), and causes the crest value variation detection section 40 to detect the variation in peak voltage. Then, when it is determined in this detection period that electric power can be supplied to the power receiving device 2, the drive control section 50 continues the supply of the drive signal DRV to the drive transistor 13 for a predefined power supply period (second period) after the detection period, to thereby continuously drive the feeding coil 11. When it is determined in this detection period that electric power cannot be supplied to the power receiving device 2, the drive control section 50 stops the supply of the drive signal DRV to the drive transistor 13 in the power supply period after the detection period, to thereby intermittently drive the feeding coil 11.

The drive control section 50 includes an intermittent control section 51, a timing generation section 52, an AND circuit 53, and a switching section 54.

The intermittent control section 51 performs control to switch between the continuous drive of the feeding coil 11 and the intermittent drive of the feeding coil 11 described above based on a signal A and a signal B that are timing signals generated by the timing generation section 52 and the detection signal C of the crest value variation detection section 40. For example, when electric power can be supplied to the power receiving device 2, the intermittent control section 51 sets its output signal D to the H state to continuously supply the drive signal DRV to the drive transistor 13. For example, when electric power cannot be supplied to the power receiving device 2, the intermittent control section 51 sets the output signal D to the L state to stop the supply of the drive signal DRV to the drive transistor 13.

The timing generation section 52 generates the above-mentioned detection period (first period) and power supply period (second period) alternately and regularly. Specifically, the timing generation section 52 generates the signal A and the signal B that are the timing signals for generating the detection period and the power supply period, and outputs the generated signals A and B to the intermittent control section 51 and the switching section 54. Note that, the details of the signal A and the signal B are described later.

The AND circuit 53 is an operational circuit for implementing AND logical operation (logical conjunction) on two input signals, and based on the output signal D (drive control signal) of the intermittent control section 51, controls whether or not to supply the drive signal DRV to the drive transistor 13 via the switching section 54.

The switching section 54 is, for example, a selector circuit for selecting and outputting one of a terminal-A input and a terminal-B input based on a control signal. Based on the signal A output from the timing generation section 52, the switching section 54 outputs the terminal-A input (drive signal DRV) or the terminal-B input (output of the AND circuit 53) to the gate terminal of the drive transistor 13.

For example, when the signal A is in the L state, the switching section 54 outputs the terminal-A input (drive signal DRV) to the gate terminal of the drive transistor 13. When the signal A is in the H state, the switching section 54 outputs the terminal-B input (output of the AND circuit 53) to the gate terminal of the drive transistor 13.

<Configuration of Power Receiving Device 2>

The power receiving device 2 includes the receiving coil 21, the resonant capacitor 22, a resonance control transistor 23, a rectifier diode 24, a smoothing capacitor 25, the battery 26, and a resonance control section 60.

The receiving coil 21 has a first terminal connected to a node N5 and a second terminal connected to a power supply GND1. The receiving coil 21 is supplied with electric power from the feeding coil 11 included in the power feeding device 1 via, for example, electromagnetic induction or electromagnetic coupling. For charging the battery 26, the receiving coil 21 is arranged to be opposed to the feeding coil 11.

The resonant capacitor 22 is connected in parallel to the receiving coil 21, and resonates with the receiving coil 21. The resonant capacitor 22 is connected between the node N5 and a node N6. The receiving coil 21 and the resonant capacitor 22 construct the resonant circuit 20. The resonant circuit 20 resonates at a given resonant frequency (for example, 100 kHz) determined by an inductance value of the receiving coil 21 and a capacitance value of the resonant capacitor 22. Note that, in this embodiment, the resonant frequency of the power receiving device 2 and the resonant frequency of the power feeding device 1 are equal to each other, for example, 100 kHz.

The resonance control transistor 23 (first switching element) is a switching element connected to the resonant circuit 20, and is connected in parallel to the receiving coil 21 together with the resonant capacitor 22 and connected in series to the resonant capacitor 22. The resonance control transistor 23 is, for example, an NMOS transistor, and has a source terminal connected to the power supply GND1 and a drain terminal connected to the node N6. The resonance control transistor 23 has a gate terminal connected to an output signal line of the resonance control section 60 to be described later. When the resonance control transistor 23 is set to the ON state by the resonance control section 60, the resonant capacitor 22 functions to resonate the resonant circuit 20. When the resonance control transistor 23 is set to the OFF state by the resonance control section 60, the resonant capacitor 22 is electrically disconnected to stop the resonance of the resonant circuit 20.

The rectifier diode 24 (rectifier section) has an anode terminal connected to the node N5 corresponding to one terminal of the receiving coil 21 and a cathode terminal connected to a node N7 corresponding to one terminal of the smoothing capacitor 25. The rectifier diode 24 rectifies and converts electric power received by the receiving coil 21 into DC electric power. Specifically, the rectifier diode 24 converts AC electric power (AC voltage) generated in the receiving coil 21 into DC electric power (DC voltage), to thereby supply electric power for charging the battery 26.

The smoothing capacitor 25 smooths the DC electric power converted by the rectifier diode 24.

The battery 26 is, for example, a storage battery or a secondary battery, and is charged with the DC voltage rectified by the rectifier diode 24. Specifically, the battery 26 is charged with DC electric power obtained by rectifying electric power received by the receiving coil 21. The battery 26 is connected in series to a resistor 27, and has an anode terminal (positive (plus) terminal) connected to the node N7 and a cathode terminal (negative (minus) terminal) connected to a node N8.

The resistor 27 is connected between the node N8, which is connected to the cathode terminal (negative (minus)) terminal) of the battery 26, and the power supply GND1, and corresponds to a voltage conversion section for converting a charge current into a voltage. The resistor 27 outputs a change in charge current of the battery 26 to the node N8 as a change in voltage.

The resonance control section 60 controls the resonance control transistor 23, to thereby control the resonant state of the resonant circuit 20. The resonance control section 60 controls the resonance control transistor 23 in accordance with a current (charge current) flowing into the battery 26 that is charged with DC electric power obtained by rectifying electric power received by the receiving coil 21. The resonance control section 60 includes an operational amplifier 61, resistors (62, 63), a comparator 64, and a reference power supply 65.

The operational amplifier 61 has a positive input terminal connected to the node N8 and a negative input terminal connected to a node N9. The operational amplifier 61 has an output terminal connected to a node N10.

The resistor 62 is connected between the node N9 and the power supply GND1, and the resistor 63 is connected between the node N9 and the node N10.

Note that, the operational amplifier 61 and the resistors (62, 63) construct an amplifier circuit. This amplifier circuit amplifies a voltage converted from the charge current by the resistor 27, and supplies the amplified voltage to the comparator 64. This configuration can reduce the resistance value of the resistor 27, and hence the resonance control section 60 can improve the accuracy of detection of the charge current.

The comparator 64 compares the voltage converted by the resistor 27 and an output voltage of the reference power supply 65. When the converted voltage is equal to or higher than the output voltage of the reference power supply 65, the comparator 64 sets the resonance control transistor 23 to the OFF state. The comparator 64 has a positive input terminal connected to the reference power supply 65 and a negative input terminal connected to the node N10. In this case, the voltage of the node N10 corresponds to the charge current of the battery 26.

The reference power supply 65 is a constant voltage source for outputting a predetermined threshold voltage corresponding to a predetermined threshold current.

Specifically, the comparator 64 outputs the H state to its output terminal when the voltage converted by the resistor 27 is lower than the predetermined threshold voltage. The comparator 64 outputs the L state to its output terminal when the voltage converted by the resistor 27 is equal to or higher than the predetermined threshold voltage.

In this manner, the resonance control section 60 controls the resonance control transistor 23 in accordance with the charge current of the battery 26, to thereby change the resonant state of the resonant circuit 20.

Next, the configurations of the crest value variation detection section 40 and the intermittent control section 51 according to this embodiment are described with reference to FIG. 2.

Figure 2:
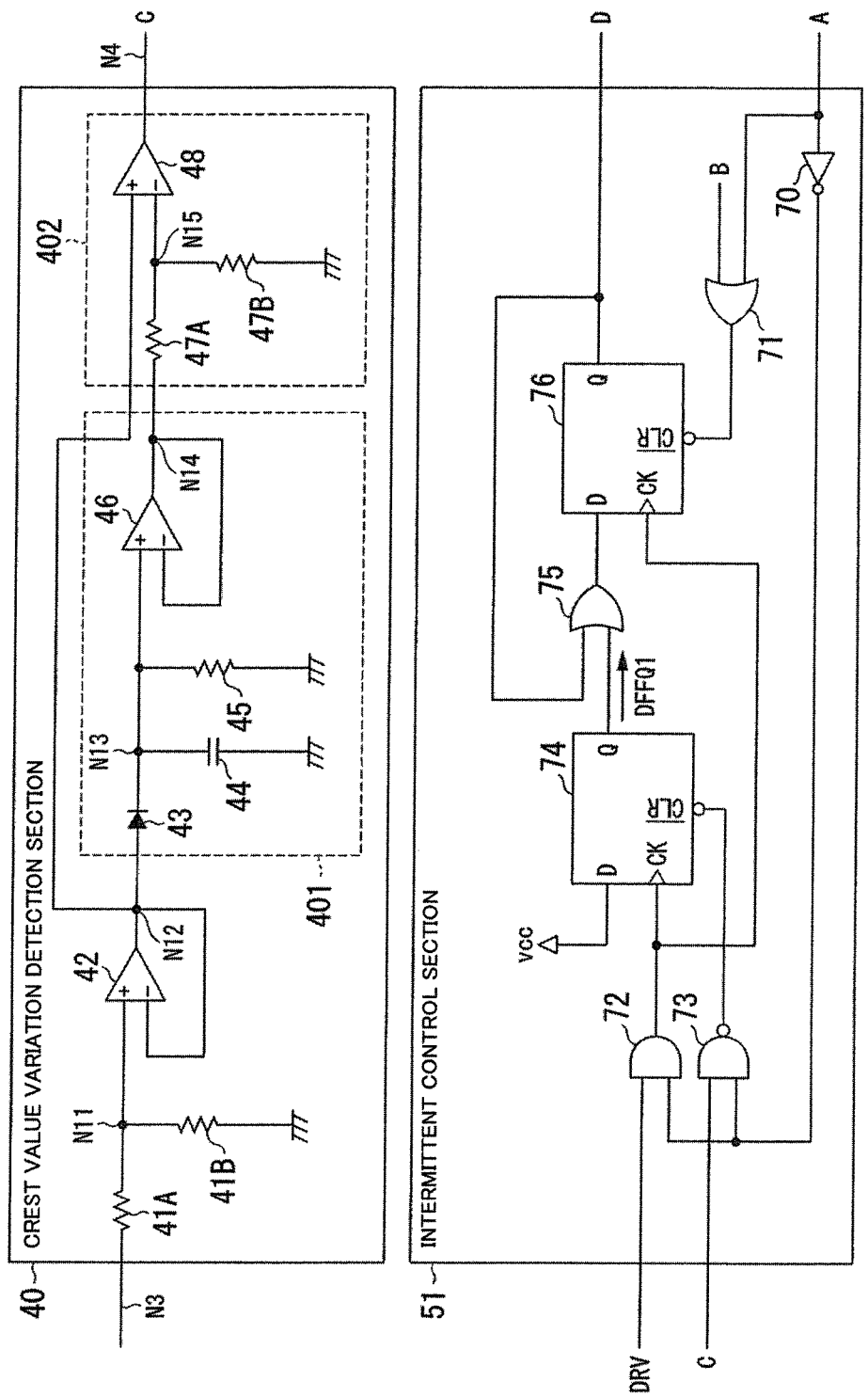
FIG. 2 is a block diagram illustrating an example of a crest value variation detection section and an intermittent control section according to the first embodiment.

FIG. 2 is a block diagram illustrating an example of the crest value variation detection section 40 and the intermittent control section 51 according to this embodiment.

<Configuration of Crest Value Variation Detection Section 40>

Referring to FIG. 2, the crest value variation detection section 40 includes resistors (41A, 41B), an operational amplifier 42, a peak hold circuit 401, and a variation detection circuit 402.

The resistors (41A, 41B) output to a node N11 a voltage obtained by decreasing the voltage of the node N3 by voltage division at the ratio of resistance values of the resistor 41A and the resistor 41B.

The operational amplifier 42 forms a voltage follower circuit, and outputs a voltage equal to the voltage of the node N11 to the node N12.

The peak hold circuit 401 holds a peak voltage of an input voltage signal, and outputs the held peak voltage. In this case, the peak hold circuit 401 holds a peak voltage of an excited voltage of the feeding coil 11 obtained by voltage division of the resistors (41A, 41B).

The peak hold circuit 401 includes a diode 43, a capacitor 44, a resistor 45, and an operational amplifier 46.

The diode 43 has an anode terminal connected to the node N11 and a cathode terminal connected to a node N13 corresponding to one terminal of the capacitor 44. The diode 43 prevents the reverse flow of current when a voltage lower than the held peak voltage is input from the node N12.

The capacitor 44 has a first terminal connected to the node N13 and a second terminal connected to the power supply GND. The capacitor 44 holds a peak voltage of the voltage signal input to the peak hold circuit 401.

The resistor 45 has a first terminal connected to the node N13 and a second terminal connected to the power supply GND. The resistor 45 discharges the held peak voltage to initialize the peak hold circuit 401.

The operational amplifier 46 forms a voltage follower circuit, and outputs a voltage equal to the voltage of the node N13 to a node N14.

The variation detection circuit 402 (detection circuit) detects a variation in peak voltage based on the voltage held by the peak hold circuit 401 and the peak voltage of the excited voltage. Specifically, the variation detection circuit 402 compares a voltage obtained by decreasing the output voltage of the peak hold circuit 401 by voltage division at a predetermined resistance ratio and the input voltage of the peak hold circuit 401, and outputs a result of the comparison to the node N4 as the detection signal C.

The variation detection circuit 402 includes resistors (47A, 47B) and a comparator 48.

The resistors (47A, 47B) output to a node N15 a voltage obtained by decreasing the output voltage of the peak hold circuit 401 (voltage of the node N14) by voltage division at the ratio of resistance values of the resistor 47A and the resistor 47B.

The comparator 48 has a positive input terminal connected to the node N12 and a negative input terminal connected to the node N15. The comparator 48 compares the voltage of the node N15 and the voltage input from the peak hold circuit 401, and outputs a result of the comparison to the node N4 as the detection signal C. In this case, the voltage of the node N15 is a voltage obtained by decreasing the peak voltage at a predetermined ratio by the resistors (47A, 47B). When the peak voltage does not vary, the voltage of the node N12 becomes higher than the voltage of the node N15, and hence the comparator 48 outputs the H state to the detection signal C. When the peak voltage varies, the voltage of the node N12 decreases to be lower than the voltage of the node N15, and hence the comparator 48 outputs the L state to the detection signal C.

<Configuration of Intermittent Control Section 51>

The intermittent control section 51 includes an inverter 70, OR circuits (71, 75), an AND circuit 72, a NAND circuit 73, and flip-flops (D-F/Fs) (74, 76).

The inverter 70 is, for example, an inverting output circuit for outputting a signal obtained by logically inverting an input signal, and has an input terminal connected to a signal line of the signal A and an output terminal connected to input terminals of the AND circuit 72 and the NAND circuit 73. Note that, the inverter 70 outputs an inverted signal of the signal A.

The OR circuit 71 is, for example, an operational circuit for implementing OR logical operation (logical disjunction) on two input signals, and generates a reset signal of the D-F/F 76 based on the signal A and the signal B.

The AND circuit 72 is, for example, an operational circuit for implementing AND logical operation on two input signals, and outputs a clock signal of the D-F/Fs (74, 76) based on the inverted signal of the signal A and the drive signal DRV. In this case, the drive signal DRV is input to the D-F/Fs (74, 76) as the clock signal.

The NAND circuit 73 is, for example, an operational circuit for implementing NAND logical operation on two input signals, and outputs a reset signal of the D-F/F 74 based on the inverted signal of the signal A and the detection signal C of the crest value variation detection section 40.

The D-F/F 74 has a terminal D connected to the power supply VCC, and outputs an output signal DFFQ1 to the OR circuit 75.

The OR circuit 75 implements logical disjunction on the output signal DFFQ1 of the D-F/F 74 and an output signal D of the D-F/F 76, and outputs the resultant output signal to a terminal D of the D-F/F 76.

The D-F/F 76 has the terminal D connected to an output signal line of the OR circuit 75, and outputs the drive control signal D to the AND circuit 53 and the OR circuit 75 as its output signal.

Next, the operation of the power feeding system 100 according to this embodiment is described with reference to the drawings.

First, the operation of the power receiving device 2 is described below.

Figure 3:
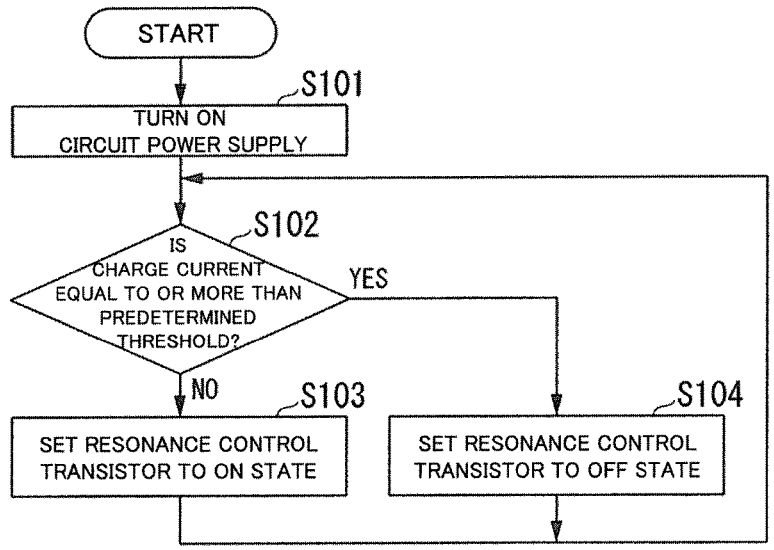
FIG. 3 is a flowchart illustrating an example of operation of a power receiving device according to the first embodiment.

FIG. 3 is a flowchart illustrating an example of the operation of the power receiving device 2 according to this embodiment.

Referring to FIG. 3, the operation relating to control of the resonant state of the resonant circuit 20 of the power receiving device 2 is described.

First, the power receiving device 2 turns on the circuit power supply (powered-on state) (Step S101). For example, electric power is supplied from the feeding coil 11 of the power feeding device 1 to the receiving coil 21 of the power receiving device 2 by wireless (in a contactless manner), and electric power is supplied to the battery 26.

Next, the power receiving device 2 determines whether or not the charge current is equal to or more than a predetermined threshold (Step S102). Specifically, the resonance control section 60 converts the charge current of the battery 26 into a voltage, and determines whether or not the converted voltage is equal to or higher than a predetermined threshold voltage, to thereby determine whether or not the charge current is equal to or more than the predetermined threshold.

When the charge current is less than the predetermined threshold (Step S102: NO), the resonance control section 60 sets the resonance control transistor 23 to the ON state (Step S103). Specifically, the resonance control section 60 outputs the H state to the gate terminal of the resonance control transistor 23. In this manner, the resonance control transistor 23 becomes the ON state to electrically connect the resonant capacitor 22 to the resonant circuit 20.

When the charge current is equal to or more than the predetermined threshold (Step S102: YES), the resonance control section 60 sets the resonance control transistor 23 to the OFF state (Step S104). Specifically, the resonance control section 60 outputs the L state to the gate terminal of the resonance control transistor 23. In this manner, the resonance control transistor 23 becomes the OFF state to electrically disconnect the resonant capacitor 22 from the resonant circuit 20.

After the processing of Step S103 or Step S104, the flow returns to the processing of Step S102, and the processing of Step S102 to Step S104 is repeated.

In this manner, the resonance control section 60 performs control to switch the resonant state of the resonant circuit 20 so that the charge current may not exceed the predetermined threshold. Specifically, the resonance control section 60 performs control to intermittently switch the resonant circuit 20 between the resonant state and the non-resonant state so that the charge current may not exceed the predetermined threshold. Consequently, the voltage of the feeding coil 11 of the power feeding device 1 is observed as a periodic variation as shown in FIG. 4.

Figure 4:
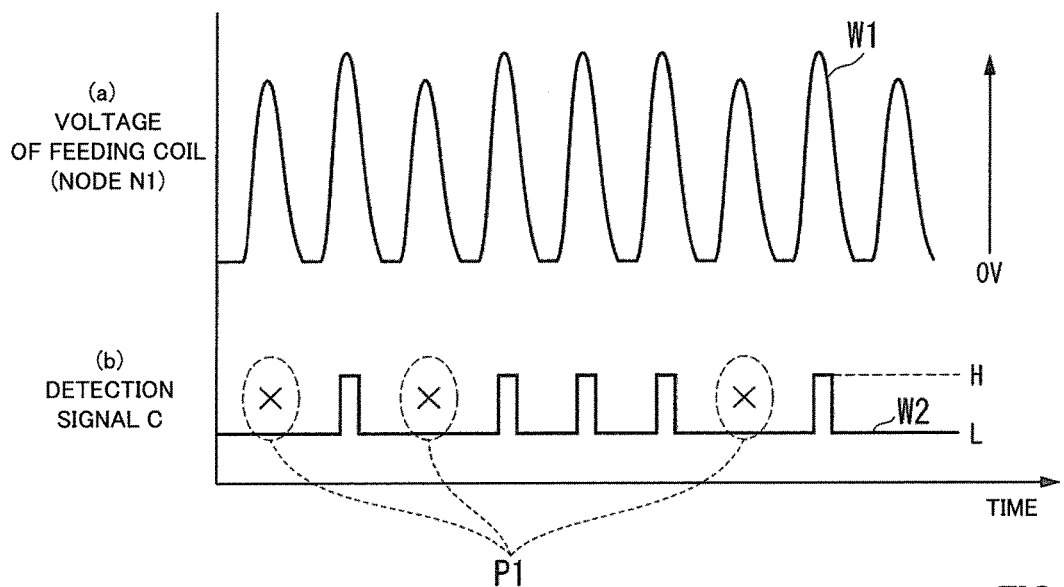
FIG. 4 is a graph showing an example of a voltage of a feeding coil and a detection signal of the crest value variation detection section in a case where electric power can be supplied to the power receiving device.

FIG. 4 is a graph showing an example of the voltage of the feeding coil 11 and the detection signal C of the crest value variation detection section 40 in the case where electric power can be supplied to the power receiving device 2.

Referring to FIG. 4, waveforms W1 and W2 represent, in order from the top, the waveforms of (a) the voltage of the feeding coil 11 (voltage of the node N1) and (b) the detection signal C of the crest value variation detection section 40. Note that, the vertical axis represents the voltage for the waveform (a) and the logic state for the waveform (b). The horizontal axis represents time.

The example of FIG. 4 shows the case where electric power can be supplied to the power receiving device 2, and the resonant circuit 20 of the power receiving device 2 is switched between the resonant state and the non-resonant state. Accordingly, the peak voltage of the voltage of the feeding coil 11 varies as indicated by the waveform W1.

At the position at which the peak voltage is low (see the point P1 of the waveform W2), the crest value variation detection section 40 does not output a pulse signal as the detection signal C as indicated by the waveform W2.

Note that, the power receiving device 2 switches the resonant state of the resonant circuit 20 at different frequencies depending on the state of a load (for example, the charge current or charge voltage). In the case of a light load, the frequency of switching the resonant state is low, and hence the peak voltage varies once every several tens to several hundreds of times of repeated driving of the feeding coil. As a result, the frequency of no output of the detection signal C is once every several tens to several hundreds of driving, which is low.

As described above, the variation in peak voltage detected by the crest value variation detection section 40, which is caused by the resonant circuit 20 of the power receiving device 2, does not always occur in a successive manner for every cycle. Thus, the intermittent control section 51 has the function of holding the presence/absence of the variation in peak voltage in order to know the variation even if the variation occurs once every several tens to several hundreds of times of driving.

Figure 5:
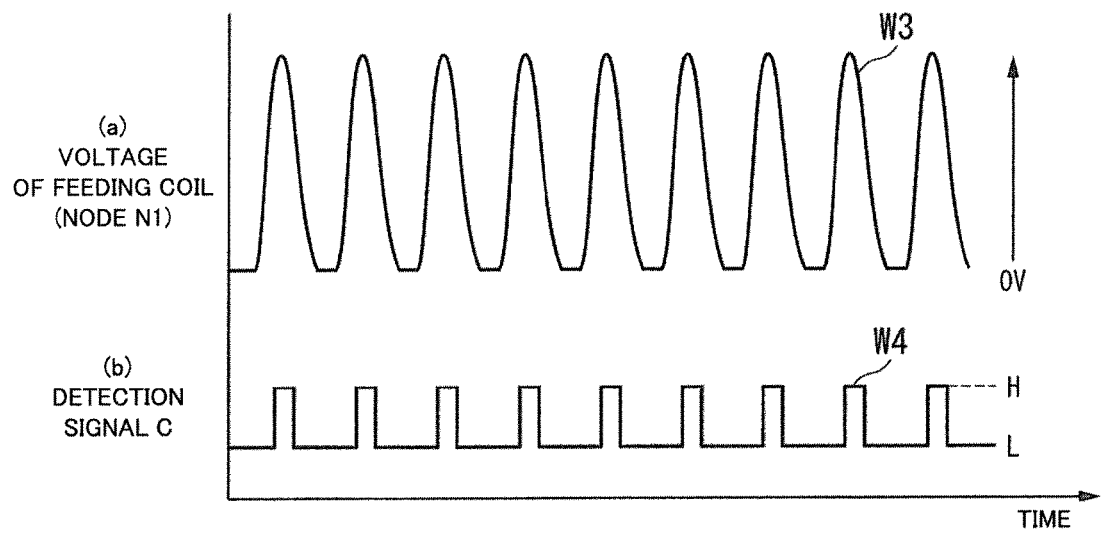
FIG. 5 is a graph showing an example of the voltage of the feeding coil and the detection signal of the crest value variation detection section in a case where electric power cannot be supplied to the power receiving device.

FIG. 5 is a graph showing an example of the voltage of the feeding coil 11 and the detection signal C of the crest value variation detection section 40 in the case where electric power cannot be supplied to the power receiving device 2.

Referring to FIG. 5, waveforms W3 and W4 represent, in order from the top, the waveforms of (a) the voltage of the feeding coil 11 (voltage of the node N1) and (b) the detection signal C of the crest value variation detection section 40. Note that, the vertical axis represents the voltage for the waveform (a) and the logic state for the waveform (b). The horizontal axis represents time.

The example of FIG. 5 shows, for example, the case where a metallic foreign object is placed on the feeding coil 11 or electric power cannot be supplied to the power receiving device 2, and the resonant state of the resonant circuit 20 of the power receiving device 2 is not switched. Accordingly, the peak voltage of the voltage of the feeding coil 11 does not vary as indicated by the waveform W3.

Accordingly, as indicated by the waveform W4, the crest value variation detection section 40 always outputs a pulse signal as the detection signal C.

In this manner, the power feeding device 1 according to this embodiment is capable of determining whether or not electric power can be received by the power receiving device 2 based on the variation in peak voltage of the voltage of the feeding coil 11, and based on a result of the determination, switches between continuous driving and intermittent driving of the feeding coil 11.

Note that, the power feeding system 100 according to this embodiment determines whether or not electric power can be received by the power receiving device 2 by detecting the variation in voltage of the feeding coil, and hence, for example, it is not necessary to provide a large-scale dedicated transmission or reception section configured to notify or receive a signal for detecting a foreign matter from the power receiving side to the power feeding side. Further, the power feeding system 100 is not required to be provided with a pass dedicated for notification or reception, such as a notifying coil and a reception coil.

Figure 6:
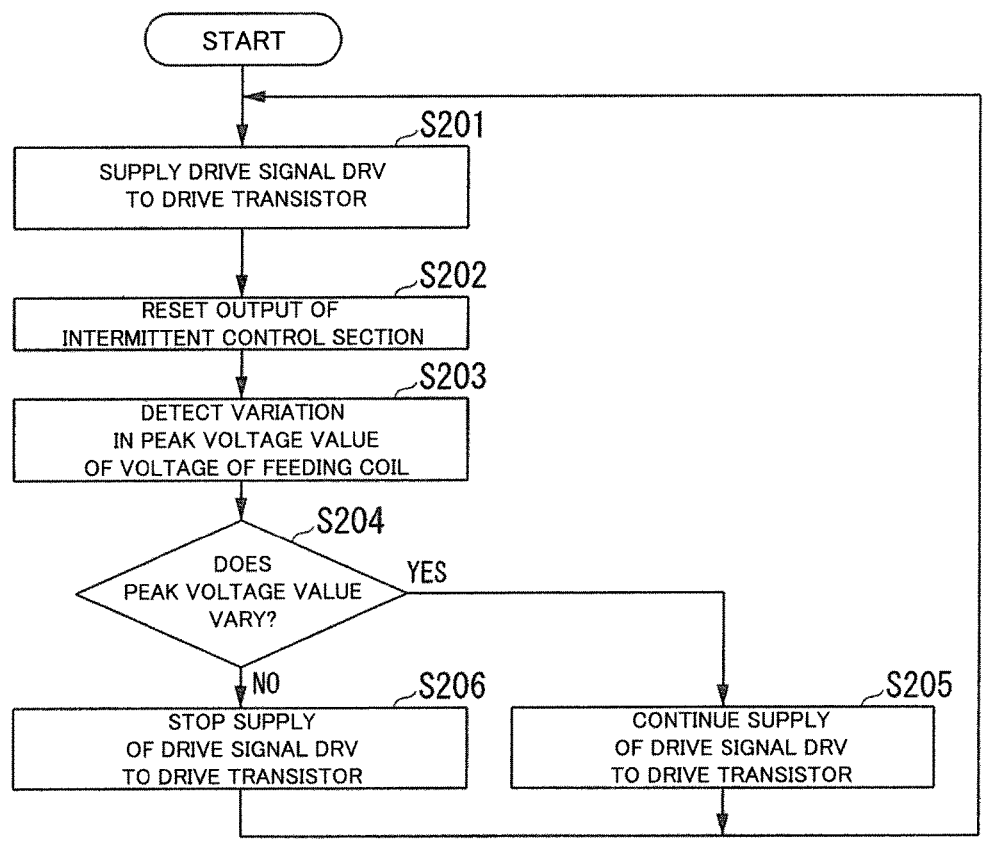
FIG. 6 is a flowchart illustrating an example of operation of a power feeding device according to the first embodiment.

FIG. 6 is a flowchart illustrating an example of the operation of the power feeding device 1 according to this embodiment.

Referring to FIG. 6, the drive control section 50 of the power feeding device 1 first supplies the drive signal DRV to the drive transistor 13 (Step S201). Specifically, the timing generation section 52 of the drive control section 50 outputs the L state to the signal A and the signal B, and the switching section 54 is switched to the terminal-A side. In this manner, the drive signal DRV is supplied from the drive signal generation section 30 to the gate terminal of the drive transistor 13.

Next, the drive control section 50 resets (initializes) the drive control signal D of the intermittent control section 51 (Step S202). Specifically, the timing generation section 52 outputs the L state to the signal A and the signal B, to thereby reset the drive control signal D of the D-F/F 76 of the intermittent control section 51.

Next, the crest value variation detection section 40 of the power feeding device 1 detects a variation in peak voltage of the voltage of the feeding coil 11 (Step S203).

Next, the intermittent control section 51 determines whether or not the peak voltage varies (Step S204). Specifically, the timing generation section 52 sets the signal B to the H state so as to transition to the detection period, and the intermittent control section 51 determines whether or not the peak voltage varies based on the detection signal C of the crest value variation detection section 40.

When the peak voltage varies (Step S204: YES), the intermittent control section 51 continues the supply of the drive signal DRV to the drive transistor 13 (Step S205). Specifically, the intermittent control section 51 sets the drive control signal D to the H state, and the AND circuit 53 supplies the drive signal DRV to the terminal-B side of the switching section 54. Then, the timing generation section 52 sets the signal A to the H state to start the power supply period, and switches the input of the switching section 54 to the terminal-B side. In this manner, the drive signal DRV is supplied to the gate terminal of the drive transistor 13 via the AND circuit 53. After the processing of Step S205, the flow returns to Step S201 after the lapse of the power supply period, and the power feeding device 1 continuously drives the feeding coil 11 as shown in FIG. 7.

Figure 8:
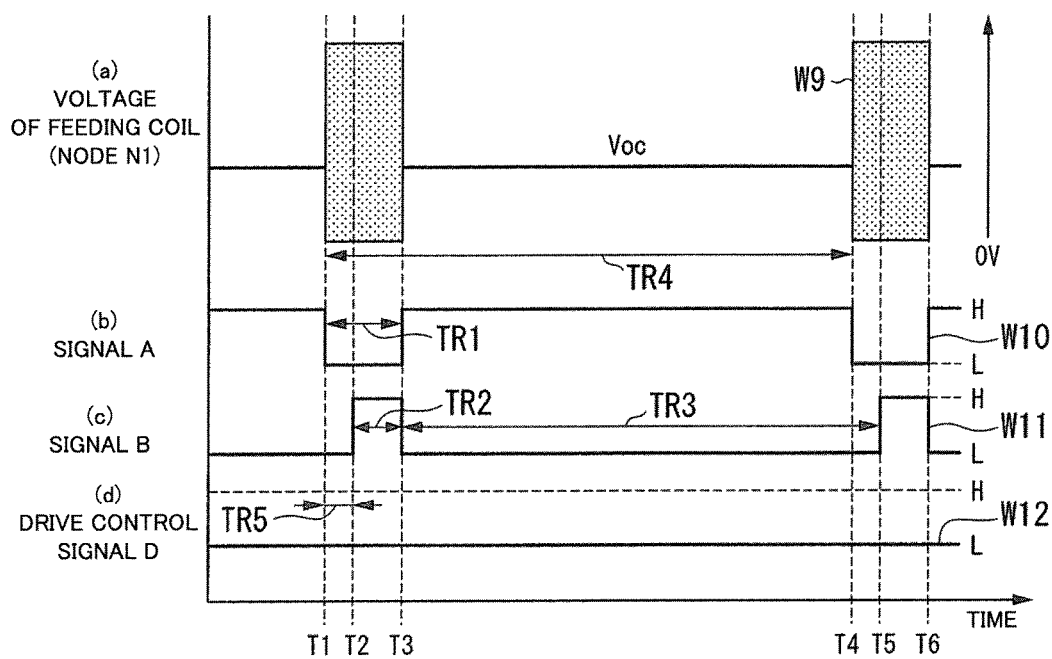
FIG. 8 is a first timing chart showing an example of the operation of the power feeding device in the case where electric power cannot be supplied to the power receiving device.

When the peak voltage does not vary (Step S204: NO), the intermittent control section 51 stops the supply of the drive signal DRV to the drive transistor 13 (Step S206). Specifically, the intermittent control section 51 sets the drive control signal D to the L state, and the AND circuit 53 stops the supply of the drive signal DRV to the terminal-B side of the switching section 54. Then, the timing generation section 52 sets the signal A to the H state to start the power supply period, and switches the input of the switching section 54 to the terminal-B side. In this manner, the supply of the drive signal DRV is stopped by the AND circuit 53, and the driving of the feeding coil 11 is stopped. After the processing of Step S206, the flow returns to Step S201 after the lapse of the power supply period, and the power feeding device 1 intermittently drives the feeding coil 11 as shown in FIG. 8.

Figure 7:
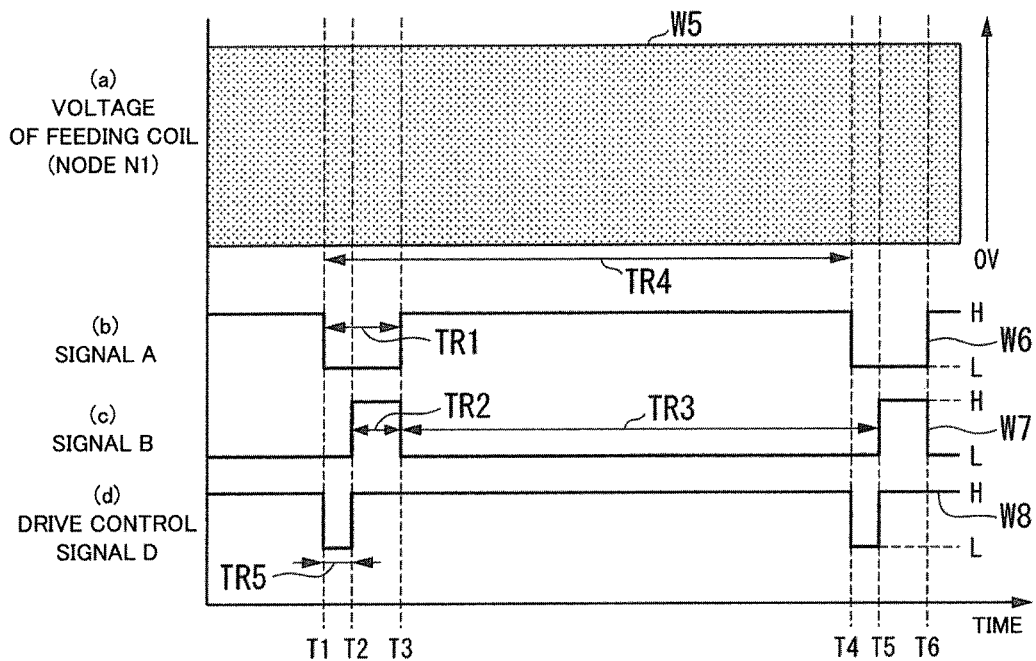
FIG. 7 is a first timing chart showing an example of the operation of the power feeding device in the case where electric power can be supplied to the power receiving device.

FIG. 7 is a first timing chart showing an example of the operation of the power feeding device 1 in the case where electric power can be supplied to the power receiving device 2.

Referring to FIG. 7, waveforms W5 to W8 represent, in order from the top, the waveforms of (a) the voltage of the feeding coil 11 (voltage of the node N1), (b) the signal A, (c) the signal B, and (d) the drive control signal D. Note that, the vertical axis represents the voltage for the waveform (a) and the logic state for the waveforms (b) to (d). The horizontal axis represents time.

At a time T1 of FIG. 7, the timing generation section 52 sets the signal A to the L state. Then, the input of the switching section 54 is switched to the terminal-A side, and the drive control signal D as the output signal of the intermittent control section 51 is reset.

Next, at a time T2, the timing generation section 52 sets the signal B to the H state. Then, a detection period TR2 is started, and the intermittent control section 51 determines whether or not the peak voltage varies based on the detection signal C of the crest value variation detection section 40.

At a time T3, the timing generation section 52 sets the signal A to the H state and the signal B to the L state. Then, a power supply period TR3 is started, and the input of the switching section 54 is switched to the terminal-B side.

The example of FIG. 7 shows the case where electric power can be supplied to the power receiving device 2, and hence the supply of the drive signal DRV from the terminal-B side of the switching section 54 is continued as indicated by the waveform W8. As a result, the power feeding device 1 performs continuous driving as indicated by the waveform W5. In this case, the power feeding device 1 is capable of supplying electric power necessary and sufficient for the charge of the battery 26 to the power receiving device 2.

Note that, the operation between a time T4 to a time T6 is the same as the operation between the time T1 to the time T3. As used herein, a period TR1 represents the period during which the signal A is in the L state, and a period TR2 represents the period during which the signal B is in the H state. The period from the time T3 to the time T4 corresponds to the power supply period TR3. A period TR4 from the time T1 to the time T4 corresponds to one cycle of the timing generation section 52. The period from the time T1 to the time T2 corresponds to a reset period TR5.

FIG. 8 is a first timing chart showing an example of the operation of the power feeding device 1 in the case where electric power cannot be supplied to the power receiving device 2.

Referring to FIG. 8, waveforms W9 to W12 represent, in order from the top, the waveforms of (a) the voltage of the feeding coil 11 (voltage of the node N1), (b) the signal A, (c) the signal B, and (d) the drive control signal D. Note that, the vertical axis represents the voltage for the waveform (a) and the logic state for the waveforms (b) to (d). The horizontal axis represents time.

The times T1 to T6 and the periods TR1 to TR5 of FIG. 8 are the same as those in FIG. 7.

The example of FIG. 8 shows the case where electric power cannot be supplied to the power receiving device 2, and hence the drive control signal D becomes the L state as indicated by the waveform W12 to stop the supply of the drive signal DRV from the terminal-B side of the switching section 54. As a result, the power feeding device 1 performs intermittent driving as indicated by the waveform W9. Note that, the voltage of the feeding coil 11 becomes a voltage Vcc of the power supply VCC in the period during which the supply of the drive signal DRV is stopped. In this case, the power feeding device 1 drives the feeding coil 11 only in the period TR1, and hence heat generation caused by a metallic foreign object placed on the feeding coil 11 can be suppressed. Further, the power feeding device 1 can reduce standby electric power.

Note that, the power supply period TR3 (second period) is defined to be longer than the detection period TR2 (first period) so that, for example, an increased temperature of a metallic foreign object caused by heat generation when the feeding coil 11 and the metallic foreign object are electromagnetically coupled to each other may be a predetermined temperature or less. As used herein, the predetermined temperature is, for example, a temperature within the range where the operation of the power feeding device 1 is guaranteed.

Next, the operation of the power feeding device 1 is described in detail with reference to FIGS. 9 to 12.

Figure 9:
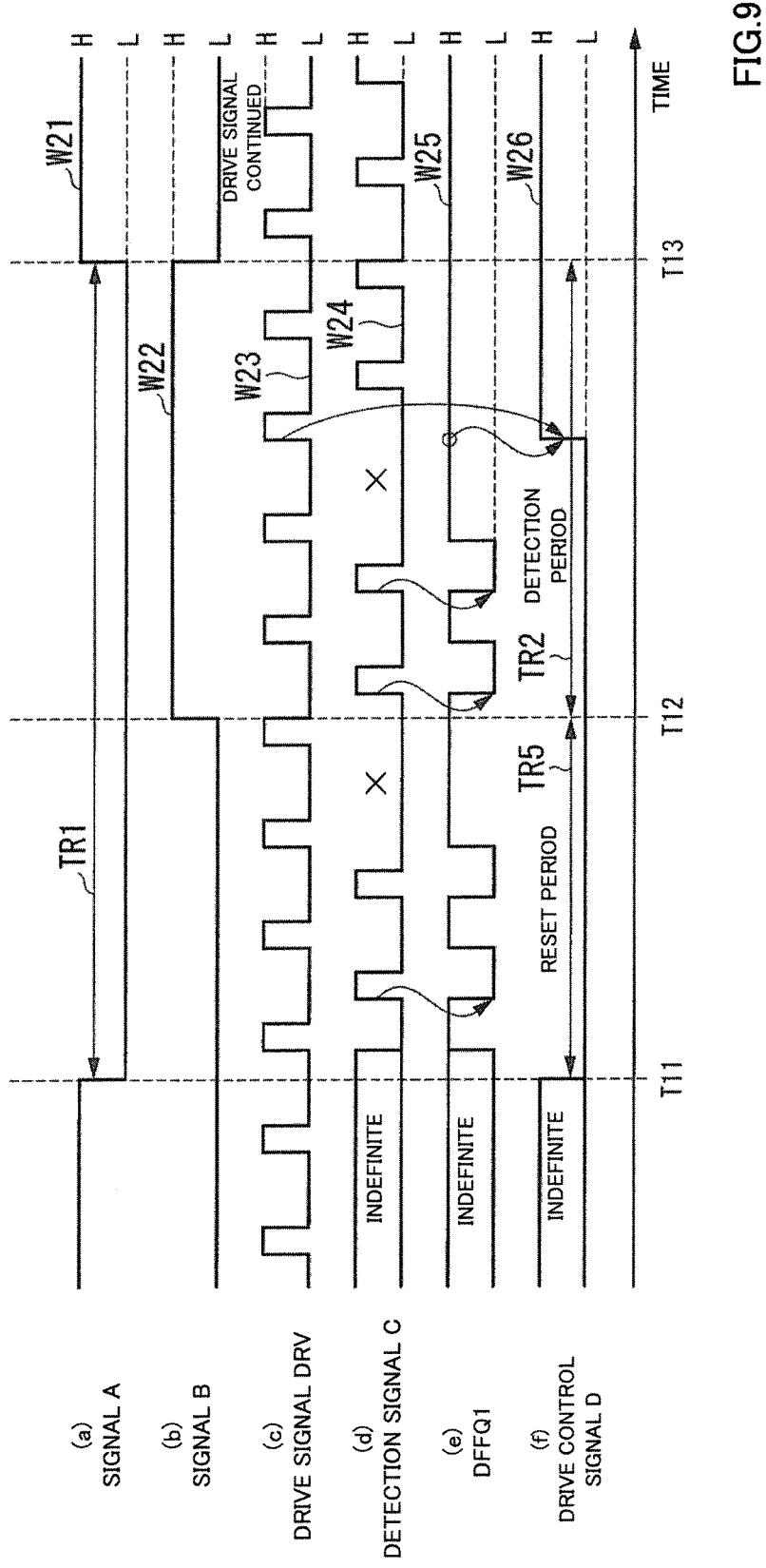
FIG. 9 is a timing chart showing an example of operation of a drive control section in the case where electric power can be supplied to the power receiving device.

FIG. 9 is a timing chart showing an example of the operation of the drive control section 50 in the case where electric power can be supplied to the power receiving device 2.

Figure 10:
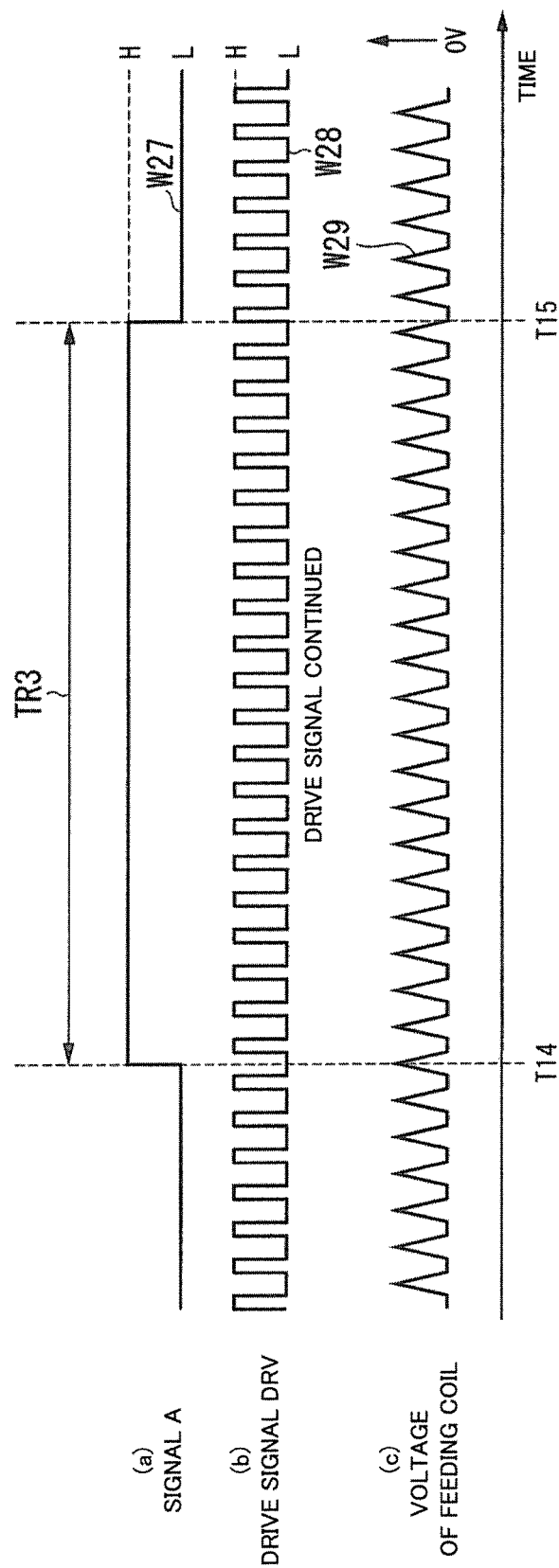
FIG. 10 is a second timing chart showing an example of the operation of the power feeding device in the case where electric power can be supplied to the power receiving device.

FIG. 10 is a second timing chart showing an example of the power feeding device 1 in the case where electric power can be supplied to the power receiving device 2.

Referring to FIG. 9, waveforms W21 to W26 represent, in order from the top, the waveforms of (a) the signal A, (b) the signal B, (c) the drive signal DRV, (d) the detection signal C, (e) the output signal DFFQ1 of the D-F/F 74, and (f) the drive control signal D. Note that, the vertical axis represents the logic state for each waveform. The horizontal axis represents time.

The period from a time T11 to a time T12 represents a reset period TR5. The period from the time T12 to a time T13 represents a detection period TR2. The period from the time T11 to the time T13 represents a period TR1 during which the signal A is in the L state.

As shown in FIG. 9, the output signal DFFQ1 of the D-F/F 74 is reset in response to the rise of the detection signal C, and the output signal DFFQ1 becomes the H state in response to the rise of the drive signal DRV. When the output signal DFFQ1 is in the H state, the drive control signal D becomes the H state in response to the rise of the drive signal DRV. Accordingly, when the variation in peak voltage is detected in the detection signal C (when no pulse signal is output) in the detection period TR2, the output signal DFFQ1 of the D-F/F 74 of the intermittent control section 51 is not reset but keeps the H state, and the drive control signal D as the output signal of the D-F/F 76 becomes the H state in response to the rise of the drive signal DRV. In this manner, the output signal of the D-F/F 76 continues to keep the H signal, and hence the drive signal DRV is continuously supplied to the drive transistor 13 even after the time T13.

In this manner, the intermittent control section 51 has the function of holding the result of detection of the presence/absence of the variation in peak voltage, for example, even when the frequency of the variation in peak voltage is reduced to once every several tens to several hundreds of times of repeated driving of the feeding coil 11. The intermittent control section 51 monitors the variation in peak voltage for every cycle of the drive signal DRV. Consequently, the presence/absence of the variation in peak voltage can be reliably known even when the frequency of switching of the resonant state is low.

Referring to FIG. 10, waveforms W27 to W29 represent, in order from the top, the waveforms of (a) the signal A, (b) the drive signal DRV, and (c) the voltage of the feeding coil 11. Note that, the vertical axis represents the logic state for the waveforms (a) and (b) and the voltage for the waveform (c). The horizontal axis represents time.

As shown in FIG. 10, in a power supply period TR3 from a time T14 to a time T15, the drive control section 50 continuously supplies the drive signal DRV to the drive transistor 13, to thereby continuously drive the feeding coil 11 (see the waveform W28 and the waveform W29).

Next, the details of the operation in the case where electric power cannot be supplied to the power receiving device 2 are described with reference to FIGS. 11 and 12.

Figure 11:
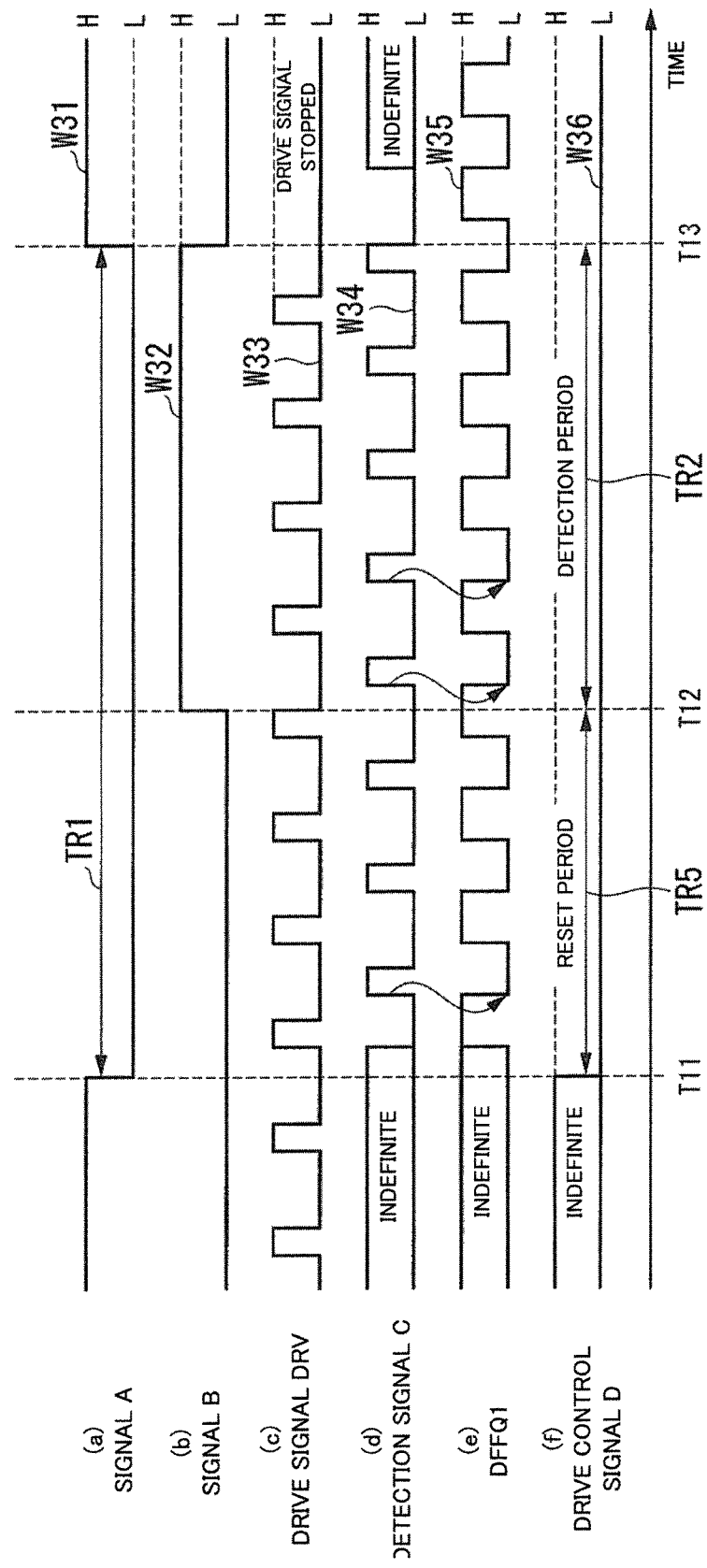
FIG. 11 is a timing chart showing an example of the operation of the drive control section in the case where electric power cannot be supplied to the power receiving device.

FIG. 11 is a timing chart showing an example of the operation of the drive control section 50 in the case where electric power cannot be supplied to the power receiving device 2.

Figure 12:
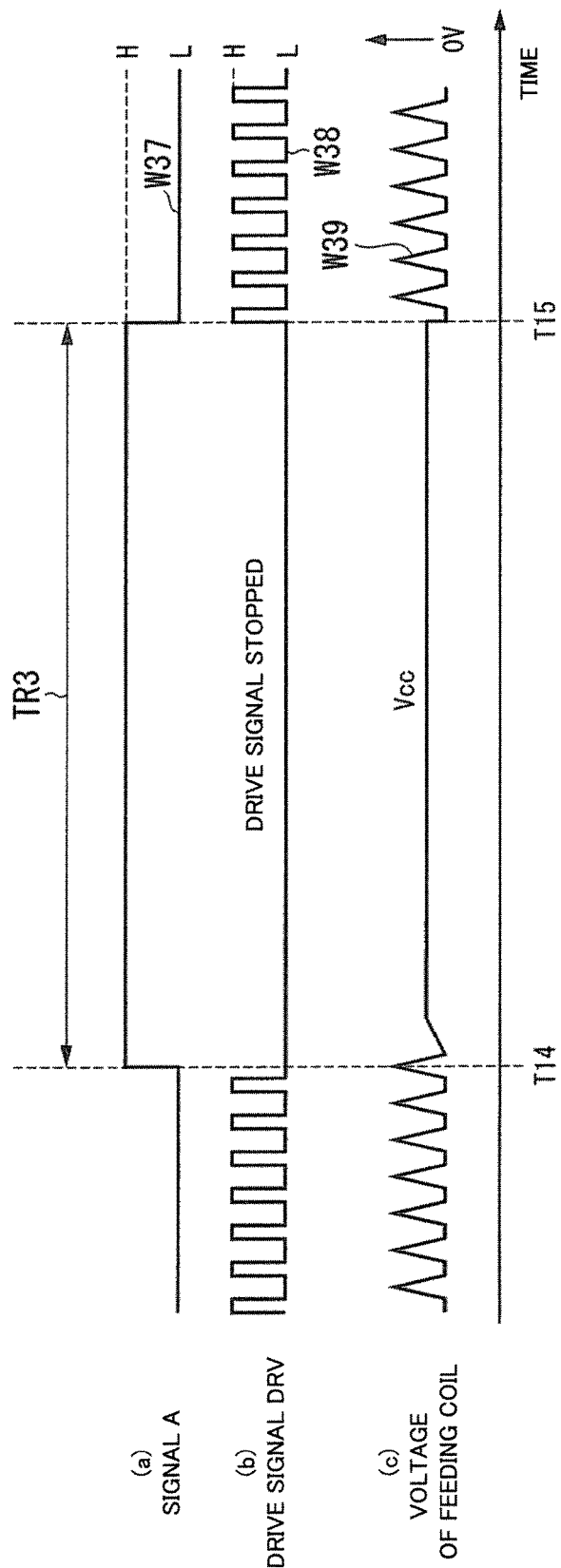
FIG. 12 is a second timing chart showing an example of the operation of the power feeding device in the case where electric power cannot be supplied to the power receiving device.

FIG. 12 is a second timing chart showing an example of the operation of the power feeding device 1 in the case where electric power cannot be supplied to the power receiving device 2.

Referring to FIG. 11, waveforms W31 to W36 represent, in order from the top, the waveforms of (a) the signal A, (b) the signal B, (c) the drive signal DRV, (d) the detection signal C, (e) the output signal DFFQ1 of the D-F/F 74, and (f) the drive control signal D. Note that, the vertical axis represents the logic state for each waveform. The horizontal axis represents time.

The period from a time T11 to a time T12 represents a reset period TR5. The period from the time T12 to a time T13 represents a detection period TR2. The period from the time T11 to the time T13 represents a period TR1 during which the signal A is in the L state.

The example of FIG. 11 shows the case where electric power cannot be supplied to the power receiving device 2, and hence the crest value variation detection section 40 does not detect a variation in peak voltage. Accordingly, the output signal DFFQ1 of the D-F/F 74 is always reset in response to the rise of the detection signal C, and the intermittent control section 51 keeps the drive control signal D to the L state. In this manner, the supply of the drive signal DRV to the drive transistor 13 is stopped after the time T13.

Referring to FIG. 12, waveforms W37 to W39 represent, in order from the top, the waveforms of (a) the signal A, (b) the drive signal DRV, and (c) the voltage of the feeding coil 11. Note that, the vertical axis represents the logic state for the waveforms (a) and (b) and the voltage for the waveform (c). The horizontal axis represents time.

As shown in FIG. 12, in a power supply period TR3 from a time T14 to a time T15, the drive control section 50 stops the supply of the drive signal DRV, to thereby intermittently drive the feeding coil 11 (see the waveform W38 and the waveform W39).

As described above, the power feeding system 100 according to this embodiment includes the power feeding device 1 including the feeding coil 11 and the power receiving device 2 including the receiving coil 21, and supplies electric power from the power feeding device 1 to the power receiving device 2 via electromagnetic induction. The power receiving device 2 includes the resonant circuit 20 including the receiving coil 21 to be supplied with electric power from the feeding coil 11, the resonant capacitor 22 configured to resonate with the receiving coil 21, and the resonance control transistor 23 (first switching element) for changing the connection state of the resonant capacitor 22 to control the resonant state of the resonant circuit 20. The power feeding device 1 includes the drive transistor 13 (second switching element), the drive signal generation section 30, the crest value variation detection section 40 (variation detection section), and the drive control section 50. The drive transistor 13 is connected in series to the feeding coil 11. The drive signal generation section 30 generates the drive signal DRV for driving the feeding coil 11 by intermittently changing the state of the drive transistor 13 between the conductive state and the non-conductive state. The crest value variation detection section 40 detects the change in the resonant state of the resonant circuit 20, which occurs in accordance with the connection state of the resonant capacitor 22, as the periodic waveform variation in the voltage excited in the feeding coil 11 (for example, the variation in peak voltage). The drive control section 50 determines whether or not electric power is suppliable to the power receiving device 2 based on the periodic waveform variation detected by the crest value variation detection section 40, and controls whether or not to continuously supply the drive signal DRV to the drive transistor 13 based on a result of the determination.

Note that, the above-mentioned periodic waveform variation includes the variation in peak voltage of the excited voltage. The crest value variation detection section 40 detects the change in the electrical connection state of the resonant capacitor 22 as the variation in peak voltage, and the drive control section 50 determines whether or not electric power is suppliable to the power receiving device 2 based on the variation in peak voltage detected by the crest value variation detection section 40.

In this manner, the power feeding system 100 according to this embodiment is capable of accurately determining whether or not electric power can be supplied to the power receiving device 2. For example, if a metallic foreign object instead of the power receiving device 2 is placed on the feeding coil 11, the power feeding system 100 according to this embodiment is capable of accurately determining that electric power cannot be supplied to the power receiving device 2 because the above-mentioned variation in peak voltage does not occur with the metallic foreign object and thus the peak voltage is constant. Note that, for example, the change in material and thickness of a metallic foreign object does not affect the fact that the peak voltage does not vary but is constant with a metallic foreign object. Thus, the power feeding system 100 according to this embodiment is capable of accurately determining whether or not electric power can be supplied to the power receiving device 2 irrespective of the material and thickness of a metallic foreign object.

Because the power feeding system 100 according to this embodiment is capable of accurately determining whether or not electric power can be supplied to the power receiving device 2, for example, when electric power can be supplied to the power receiving device 2, the drive signal DRV can be continuously supplied to the drive transistor 13, and when electric power cannot be supplied to the power receiving device 2, the supply of the drive signal DRV can be stopped. Consequently, for example, when a metallic foreign object is placed on the feeding coil 11, the power feeding system 100 according to this embodiment is capable of appropriately stopping the supply of the drive signal DRV to the drive transistor 13, and hence heat generation caused by the metallic foreign object can be suppressed. Similarly, when there is no power receiving device 2, the power feeding system 100 according to this embodiment is capable of stopping the supply of the drive signal DRV to the drive transistor 13, and hence standby electric power of the power feeding device 1 can be reduced.

Note that, the voltage waveform of the feeding coil 11 in the case where a metallic foreign object is placed on the feeding coil 11 is now described with reference to FIGS. 13A and 13B.

Figure 13A:
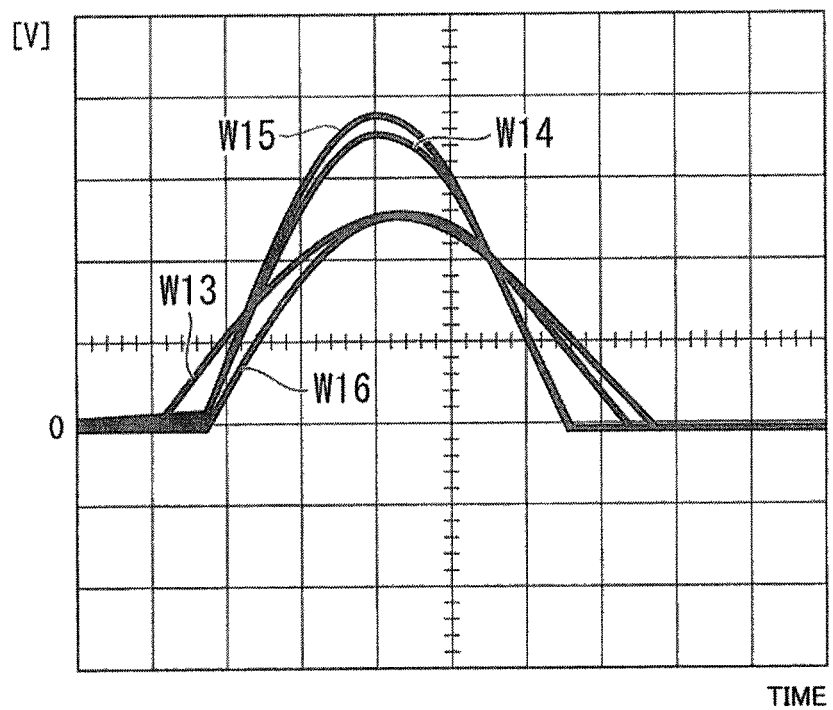
FIGS. 13A and 13B are waveform graphs showing examples of a waveform of an excited voltage in a case where a metallic foreign object is placed on the feeding coil.
Figure 13B:
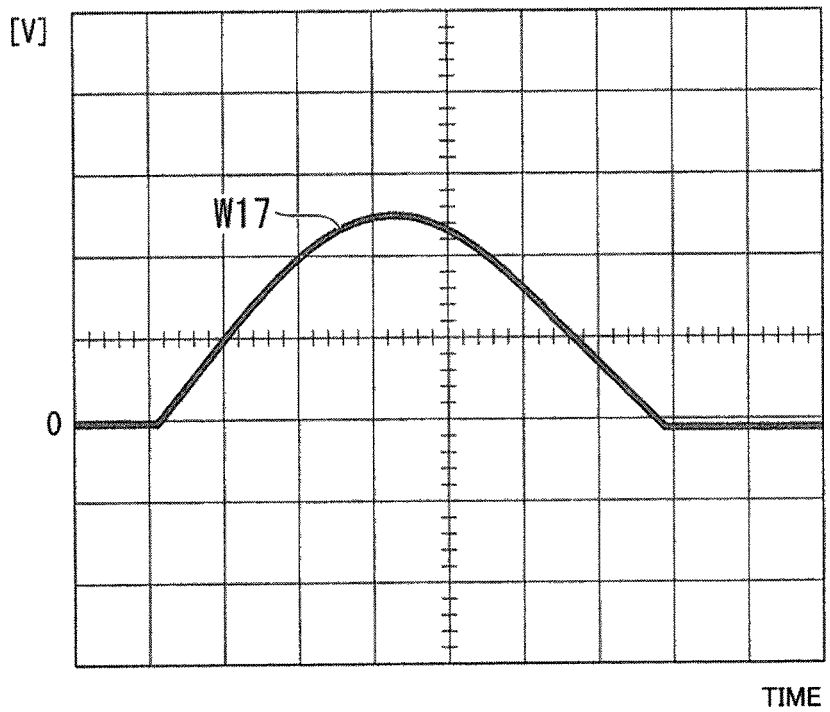

FIGS. 13A and 13B are waveform graphs showing examples of the waveform of the excited voltage in the case where a metallic foreign object is placed on the feeding coil 11.

In FIGS. 13A and 13B, the vertical axis represents the excited voltage of the feeding coil 11, and the horizontal axis represents time.

Referring to FIG. 13A, a waveform W13 represents the excited voltage measured when there is no metallic foreign object (nothing is placed), and a waveform W14 represents the excited voltage measured when an aluminum coin is placed on the feeding coil 11. A waveform W15 represents the excited voltage measured when a bronze coin is placed on the feeding coil 11, and a waveform W16 represents the excited voltage measured when a nickel coin is placed on the feeding coil 11. Referring to FIG. 13B, a waveform W17 represents the excited voltage measured when aluminum tape is placed on the feeding coil 11.

As shown in FIGS. 13A and 13B, when the material and thickness of the metallic foreign object are different, the crest value (peak voltage) and the pulse width of the excited voltage are changed. Note that, each of the waveforms W13 to W17 corresponds to one cycle of the excited voltage, and when a metallic foreign object is placed or nothing is placed, a corresponding one of the waveforms W13 to W17 is repeated as the periodic waveform. Specifically, when a metallic foreign object is placed, the waveform W3 shown in FIG. 5 is obtained, and the periodic waveform variation (variation in peak voltage or variation in pulse width) does not occur.

In this manner, when a metallic foreign object is placed on the feeding coil 11, the crest value (peak voltage) and the pulse width of the excited voltage are changed depending on the material and thickness of the metallic foreign object. Thus, it is difficult to accurately determine whether or not a metallic foreign object is placed by the method of determining that a metallic foreign object is placed by determining the magnitude of the peak voltage based on, for example, the threshold as employed in the related-art power feeding system.

In contrast, the power feeding system 100 according to this embodiment determines whether or not electric power can be supplied to the power receiving device 2 based on the periodic waveform variation (for example, the variation in peak voltage) of the excited voltage of the feeding coil 11 as described above. Consequently, it can be accurately detected that a metallic foreign object is not placed on the feeding coil 11 irrespective of the material and thickness of the metallic foreign object as described above.

In this embodiment, the drive control section 50 supplies the drive signal DRV to the drive transistor 13 in the predefined detection period TR2 (first period), to thereby cause the crest value variation detection section 40 to detect the variation in peak voltage. When it is determined in the detection period TR2 that electric power can be supplied to the power receiving device 2, the drive control section 50 continuously supplies the drive signal DRV to the drive transistor 13 in the predefined power supply period TR3 (second period) after the detection period TR2, to thereby continuously drive the feeding coil 11. When it is determined in the detection period TR2 that electric power cannot be supplied to the power receiving device 2, the drive control section 50 stops the supply of the drive signal DRV to the drive transistor 13 in the second period, to thereby intermittently drive the feeding coil 11.

In this manner, for example, when a metallic foreign object is placed on the feeding coil 11, the power feeding system 100 according to this embodiment intermittently drives the feeding coil 11, and hence heat generation caused by the metallic foreign object can be appropriately suppressed.

In this embodiment, the drive control section 50 includes the timing generation section 52 for generating the detection period TR2 and the power supply period TR3 alternately and regularly.

In this manner, for example, when a metallic foreign object is placed on the feeding coil 11, even if the peak voltage varies by chance, the power feeding system 100 according to this embodiment regularly and repeatedly determines whether or not electric power can be supplied to the power receiving device 2, and hence the possibility of an erroneous determination can be reduced.

In this embodiment, the power supply period TR3 is defined to be longer than the detection period TR2 so that, for example, an increased temperature of a metallic foreign object caused by heat generation when the feeding coil 11 and the metallic foreign object are electromagnetically coupled to each other may be a predetermined temperature or less.

In this manner, the power feeding system 100 according to this embodiment is capable of appropriately suppressing heat generation caused by the metallic foreign object.

In this embodiment, the crest value variation detection section 40 includes the peak hold circuit 401 for holding the peak voltage of the excited voltage, and the variation detection circuit 402 (detection circuit) for detecting the variation in peak voltage based on the voltage held by the peak hold circuit 401 and the peak voltage of the excited voltage.

In this manner, the power feeding system 100 according to this embodiment is capable of detecting the variation in peak voltage with use of simple circuit means.

In this embodiment, the power receiving device 2 includes the resonance control section 60 for controlling the resonance control transistor 23 to control the resonant state of the resonant circuit 20. The resonance control section 60 controls the resonance control transistor 23 in accordance with the current flowing into the battery 26 that is charged with DC electric power obtained by rectifying electric power received by the receiving coil 21.

In this manner, the power feeding system 100 according to this embodiment is capable of suppressing the occurrence of an overcurrent in the charge current when the battery 26 is charged. Further, because the resonant state of the resonant circuit 20 is switched (changed), the power feeding device 1 can accurately determine whether or not electric power can be supplied to the power receiving device 2.

Note that, a power feeding method according to this embodiment includes a varying step, a variation detection step, and a drive control step. In the varying step, the power receiving device 2 varies a resonant state of the resonant circuit 20 that includes the receiving coil 21 to be supplied with electric power from the feeding coil 11, the resonant capacitor 22 configured to resonate with the receiving coil 21, and the resonance control transistor 23 for changing a connection state of the resonant capacitor 22 to control the resonant state of the resonant circuit 20. In the variation detection step, the power feeding device 1 detects a change in the resonant state of the resonant circuit 20, which occurs in accordance with the connection state of the resonant capacitor 22, as a variation in peak voltage of the voltage excited in the feeding coil 11. Then, in the drive control step, the power feeding device 1 determines, based on the variation in peak voltage detected in the variation detection step, whether or not electric power is suppliable to the power receiving device 2, and controls, based on a result of the determination, whether or not to continuously supply the drive signal DRV to the drive transistor 13.

In this manner, the power feeding method according to this embodiment is capable of accurately determining whether or not electric power can be supplied to the power receiving device 2, and hence, for example, heat generation caused by a metallic foreign object can be suppressed. Similarly, when there is no power receiving device 2, the power feeding method according to this embodiment is capable of stopping the supply of the drive signal DRV to the drive transistor 13, and hence standby electric power of the power feeding device 1 can be reduced.

Note that, in some of the related-art power feeding systems, the power receiving side includes a regulator after the rectification section of the output of the resonant circuit. In such related-art power feeding system, the regulator accumulates energy in a smoothing capacitor or a buck coil of a switching regulator and discharges the energy, to thereby output a stable DC voltage. Accordingly, in the related-art power feeding system, a change in load current on the power receiving side tends to be small. As described above, in the related-art power feeding system, the resonant state is not switched on the power receiving side, and further the change in load current is small, and hence it is difficult for the power feeding side to detect the state of the power receiving side based on the periodic waveform variation (variation in peak voltage) of the excited voltage of the feeding coil while charging the battery.

In contrast, in the power feeding system 100 according to this embodiment, the power receiving device 2 includes the resonant circuit 20 including the receiving coil 21, the resonant capacitor 22 configured to resonate with the receiving coil 21, and the resonance control transistor 23 for changing the connection state of the resonant capacitor 22 to control the resonant state of the resonant circuit 20. With this configuration, the power receiving device 2 constantly and dynamically varies the crest value of the voltage across the receiving coil 21, and hence the power feeding system 100 according to this embodiment is capable of detecting the change in resonant state of the resonant circuit 20 as a large variation in peak voltage of the excited voltage of the feeding coil 11 while charging the battery 26. Consequently, the power feeding system 100 according to this embodiment is capable of detecting the variation in peak voltage with use of a simple detection circuit, such as the above-mentioned crest value variation detection section 40.

Some of the related-art power feeding systems have the authentication function of allowing the power receiving side to perform modulation based on a load variation to request an increase/decrease of feeding power to the power feeding side (for example, a method using the Qi standard). In such related-art power feeding system, communications are established between the power receiving side and the power feeding side to supply appropriate electric power to the power receiving side. However, in such related-art power feeding system, the power feeding side needs a demodulation circuit or a command control circuit, and the power receiving side needs a load modulation circuit for performing modulation based on a load variation and other such circuits. In order to realize those configurations, it is common practice to install microcontrollers and the like on the power feeding side and the power receiving side. This large circuit scale becomes an obstacle to downsizing of the device and cost reduction, thus raising the costs necessary for development of a microcontroller program and development of a gate array of a microcontroller IP. In such related-art power feeding system, the circuit scale tends to increase to raise power consumption, and the power consumption tends to further increase due to the load modulation. The size of the receiving coil is increased in order to compensate for the increase in power consumption, or a heat dissipation member is provided for countermeasures against heat generation of the receiving coil, with the result that the device is upsized and the cost is increased.

In contrast, the power feeding system 100 according to this embodiment does not need the communication function using load modulation unlike the above-mentioned related-art power feeding system. The power receiving device 2 performs control to switch the resonant state of the resonant circuit 20 so that the charge current may not exceed the predetermined threshold, and hence unnecessary electric power for performing load modulation other than the charge current is not consumed. With this configuration, as compared to the above-mentioned related-art power feeding system, the power feeding system 100 according to this embodiment can be realized by a simple circuit configuration requiring no microcontroller used for realizing the communication function, and the power consumption can be reduced. In addition, the power feeding system 100 according to this embodiment can reduce the power consumption and can accordingly properly reduce the size of the receiving coil 21 to suppress unnecessary heat generation of the receiving coil 21, with the result that the volume necessary for the circuit of the device can be reduced as a whole. Consequently, the power feeding system 100 according to this embodiment is capable of realizing the compact power feeding device 1 and the compact power receiving device 2.

Next, a second embodiment of the present invention is described with reference to the drawings.

Second Embodiment

Figure 14:
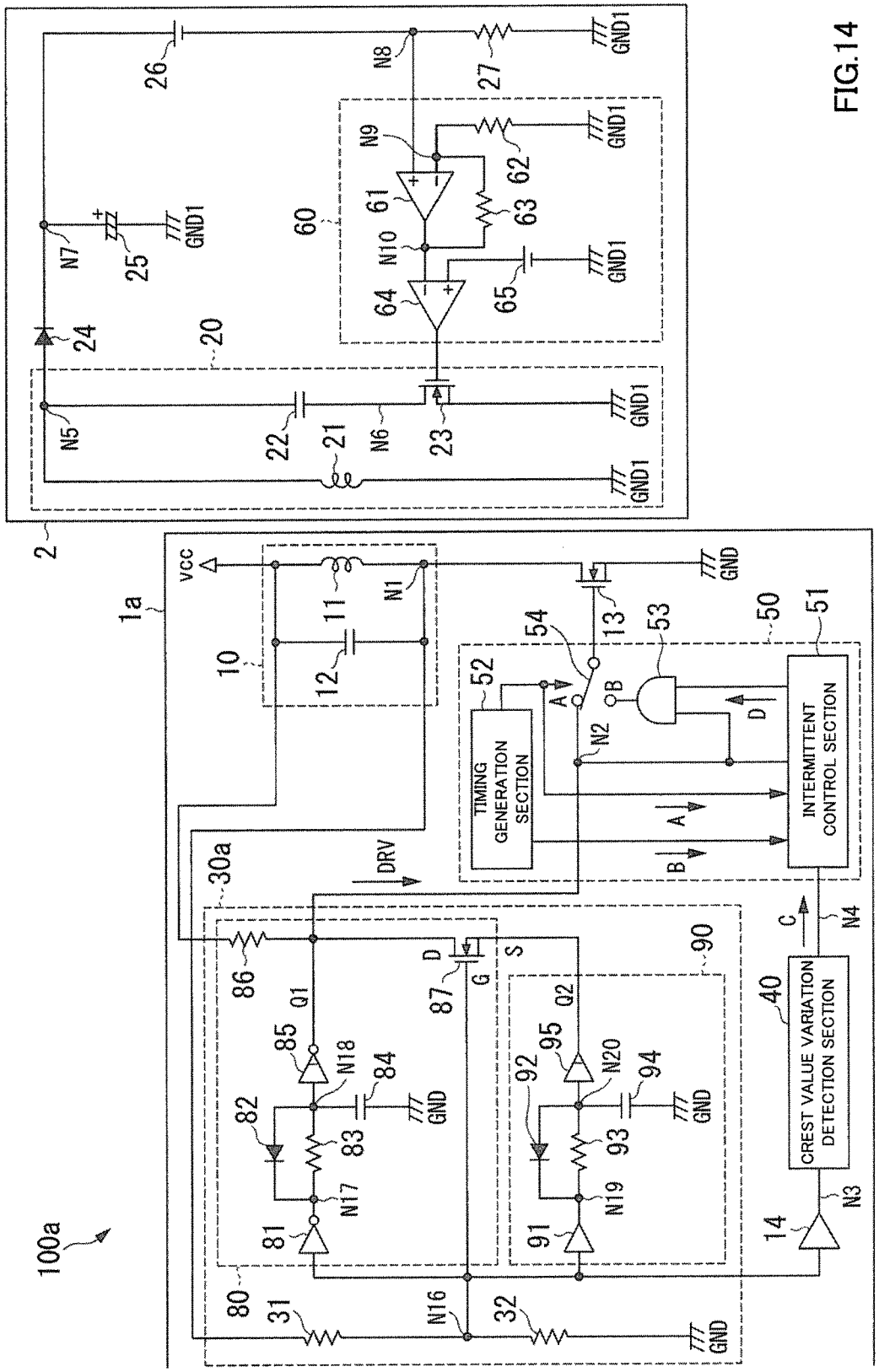
FIG. 14 is a block diagram illustrating an example of a power feeding system according to a second embodiment of the present invention.

FIG. 14 is a block diagram illustrating an example of a power feeding system 100a according to the second embodiment of the present invention.

Referring to FIG. 14, the power feeding system 100a includes a power feeding device 1a and a power receiving device 2.

The power feeding device 1a includes a feeding coil 11, a resonant capacitor 12, a drive transistor 13, a buffer 14, a drive signal generation section 30a, a crest value variation detection section 40, and a drive control section 50.

Note that, in FIG. 14, the same configuration as that of FIG. 1 is denoted by the same reference symbol, and its description is omitted.

This embodiment differs from the first embodiment in the configuration of the drive signal generation section 30a. This different configuration from the first embodiment is now described.

<Configuration of Drive Signal Generation Section 30a>

The drive signal generation section 30a includes a resistor 31, a resistor 32, an ON signal generation section 80, and an OFF signal generation section 90.

The resistor 31 and the resistor 32 are connected in series between the node N1 corresponding to the second terminal of the feeding coil 11 and the power supply GND. Specifically, the resistor 31 is connected between the node N1 and a node N16, and the resistor 32 is connected between the node N16 and the power supply GND. The resistor 31 and the resistor 32 function as a resistive voltage divider for decreasing the voltage of the node N1 to a withstand voltage range of a circuit element to be connected downstream.

The ON signal generation section 80 (first signal generation section) includes an inverter 81, a diode 82, a resistor 83, a capacitor 84, an open collector output inverter 85, a resistor 86, and a control transistor 87.

The inverter 81 has an input terminal connected to the node N16 and an output terminal connected to a node N17.

The diode 82 is connected in parallel to the resistor 83 between the inverter 81 and the open collector output inverter 85, and has an anode terminal connected to a node N18 and a cathode terminal connected to the node N17. When the input logic state of the inverter 81 becomes an H state and its output becomes an L state, the diode 82 discharges electric charges stored at the node N18 (electric charges charged in the capacitor 84) and thereby immediately sets the node N18 to the L state.

The resistor 83 is connected in parallel to the diode 82 between the node N17 and the node N18. The capacitor 84 is connected between the node N18 and the power supply GND. The resistor 83 and the capacitor 84 construct an RC circuit to determine a turn-on period (ton period) to be described later based on a time constant of the resistor 83 and the capacitor 84.

The open collector output inverter 85 is an inverting output circuit having an open collector output to invert an input signal, and has an input terminal connected to the node N18 and an output terminal connected to the node N2. For example, when the input terminal (node N18) is in the H state, the open collector output inverter 85 outputs the L state to the output terminal (node N2) as an output signal (signal Q1). For example, when the input terminal (node N18) is in the L state, the open collector output inverter 85 outputs an open state (high impedance state) to the output terminal (node N2) as the output signal (signal Q1).

The resistor 86 is connected between the power supply VCC and the node N2. The resistor 86 functions as a pull-up resistor for keeping the node N2 to the H state when the output terminal of the open collector output inverter 85 and a drain terminal of the control transistor 87, which are connected to the node N2, are in the open state.

The control transistor 87 is, for example, an NMOS transistor. The control transistor 87 has a source terminal (S) connected to the power supply GND and the drain terminal (D) connected to the node N2. The control transistor 87 has a gate terminal (G) connected to the node N16.

The control transistor 87 becomes the ON state and outputs the L state to the drain terminal, for example, when the voltage of the node N16 obtained by dividing the voltage of the feeding coil 11 (node N1) by the resistor 31 and the resistor 32 is equal to or higher than a threshold voltage of the control transistor 87. The control transistor 87 becomes the OFF state and outputs the open state to the drain terminal when the voltage of the node N16 is lower than the threshold voltage of the control transistor 87.

In the ON signal generation section 80, when the fall of the voltage of the feeding coil 11 is detected, the control transistor 87 becomes the OFF state, and the open collector output inverter 85 outputs the open state for a ton period (third period). Then, when the capacitor 84 is charged by the RC circuit and the node N18 becomes the H state (corresponding to timing after the lapse of the ton period), the open collector output inverter 85 outputs the L state. In this manner, the ON signal generation section 80 outputs the H state to the gate terminal of the drive transistor 13 for the ton period (third period) since the fall of the voltage of the feeding coil 11.

As described above, when a potential difference across the drive transistor 13 (excited voltage of the feeding coil 11) falls within a predetermined threshold range (for example, the range lower than the threshold voltage of the control transistor 87), the ON signal generation section 80 generates a drive signal DRV for setting the drive transistor 13 to the ON state for the predefined ton period and thereafter setting the drive transistor 13 to the OFF state.

When the potential difference across the drive transistor 13 (excited voltage of the feeding coil 11) becomes out of a predetermined threshold range (for example, a range of from 0 V to a threshold voltage Vth), the OFF signal generation section 90 (second signal generation section) generates a control signal for setting the drive transistor 13 to the ON state after the lapse of a predefined toffMAX period (fourth period).

As used herein, the toffMAX period represents an upper limit value of the above-mentioned toff period, and is determined to be, for example, longer than the toff period during which the voltage of the drive transistor 13 (voltage of the node N1) increases from 0 V and returns to 0 V again by the resonant circuit 10. In other words, the toffMAX period is determined to be longer than the period during which the potential difference across the drive transistor 13 changes to be outside a predetermined threshold range (for example, the range of from 0 V to the threshold voltage Vth) and returns within the predetermined threshold range by the resonant circuit 10.

The OFF signal generation section 90 includes a buffer 91, a diode 92, a resistor 93, a capacitor 94, and an open collector output buffer 95.

The buffer 91 has an input terminal connected to the node N16 and an output terminal connected to a node N19.

The diode 92 is connected in parallel to the resistor 93 between the buffer 91 and the open collector output buffer 95, and has an anode terminal connected to a node N20 and a cathode terminal connected to the node N19. When the output of the buffer 91 becomes the L state, the diode 92 discharges electric charges stored at the node N20 (electric charges charged in the capacitor 94) and thereby immediately sets the node N20 to the L state.

The resistor 93 is connected in parallel to the diode 92 between the node N19 and the node N20. The capacitor 94 is connected between the node N20 and the power supply GND. The resistor 93 and the capacitor 94 construct an RC circuit to determine the toffMAX period based on a time constant of the resistor 93 and the capacitor 94.

The open collector output buffer 95 is an output circuit having an open collector to output an input signal, and has an input terminal connected to the node N20 and an output terminal connected to the source terminal (S) of the control transistor 87. For example, when the input terminal (node N20) is in the H state, the open collector output buffer 95 outputs an open state (high impedance state) to the output terminal as an output signal (signal Q2). For example, when the input terminal (node N20) is in the L state, the open collector output buffer 95 outputs the L state to the output terminal as the output signal (signal Q2).

Next, the operation of the power feeding system 100a according to this embodiment is described.

First, the operation of the power feeding device 1a included in the power feeding system 100a is described with reference to FIGS. 15 and 16.

Figure 15:
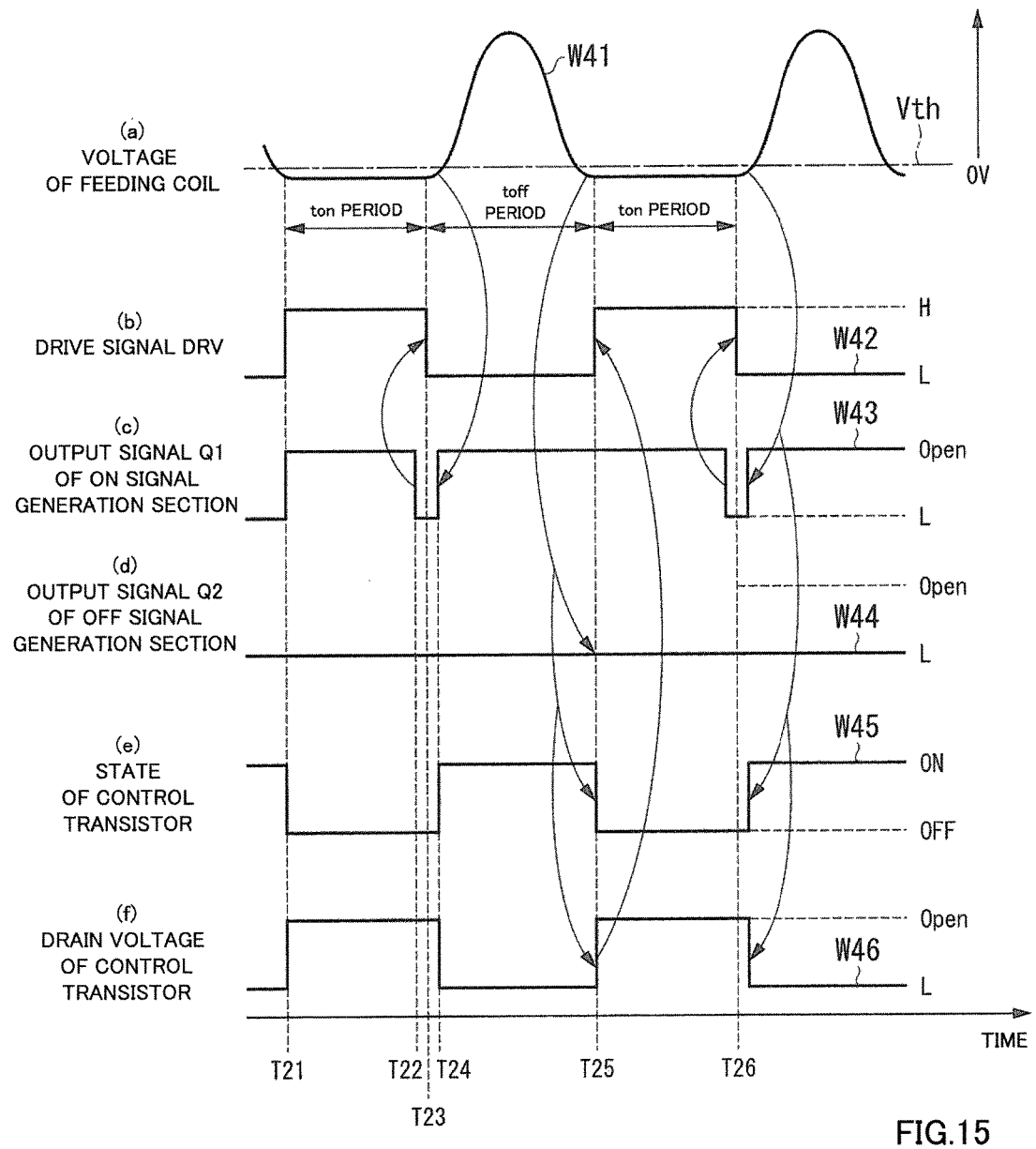
FIG. 15 is a timing chart showing an example of operation of a drive signal generation section according to the second embodiment.

FIG. 15 is a timing chart showing an example of the operation of the power feeding device 1a according to this embodiment. Note that, the timing chart of FIG. 15 shows an example of the operation of the power feeding device 1a in the case where no abrupt load variation occurs in the power receiving device 2.

Referring to FIG. 15, waveforms W41 to W46 represent, in order from the top, the waveforms of (a) the voltage of the feeding coil 11 (voltage of the node N1), (b) the drive signal DRV, (c) the output signal Q1 of the ON signal generation section 80, (d) the output signal Q2 of the OFF signal generation section 90, (e) the state of the control transistor 87, and (f) the drain voltage of the control transistor 87. Note that, the vertical axis represents the voltage for the waveform (a), the conductive (ON)/non-conductive (OFF) state for the waveform (e), and the logic state for the waveforms (b) to (d) and (f). The horizontal axis represents time. A voltage Vth is a threshold voltage for operating the ON signal generation section 80 and the OFF signal generation section 90.

Note that, in FIG. 15, the period from a time T21 to a time T23 and the period from a time T25 to a time T26 each correspond to the ton period. The period from the time T23 to the time T25 corresponds to the toff period.

First, when the voltage of the feeding coil 11 decreases to be lower than the threshold voltage Vth at the time T21, the ON signal generation section 80 outputs the open state to the output signal Q1 (see the waveform W43).

When the voltage of the feeding coil 11 decreases to be lower than the threshold voltage Vth, on the other hand, the control transistor 87 becomes the OFF state as indicated by the waveform W45, with the result that the drain voltage (voltage of the drain terminal (D)) of the control transistor 87 becomes the open state as indicated by the waveform W46. In response thereto, the node N2 is supplied with the power supply VCC via the resistor 86, and the drive signal DRV becomes the H state as indicated by the waveform W42, and hence the drive transistor 13 becomes the ON state.

Next, when the capacitor 84 is further charged and the node N18 becomes the H state at the time T22, the open collector output inverter 85 outputs the L state to the output signal Q1 (see the waveform W43).

As a result, at the time T23, the node N2 transitions from the H state to the L state, and the drive transistor 13 becomes the OFF state. In response thereto, electric power stored in the feeding coil 11 of the resonant circuit 10 is released, and the resonant circuit 10 increases the voltage of the feeding coil 11.

Next, when the voltage of the feeding coil 11 increases to be higher than the threshold voltage Vth at the time T24, the ON signal generation section 80 again outputs the open state to the output signal Q1 (see the waveform W43).

When the voltage of the feeding coil 11 increases to be higher than the threshold voltage Vth, on the other hand, the control transistor 87 becomes the ON state as indicated by the waveform W45, with the result that the control transistor 87 outputs the L state as the drain voltage as indicated by the waveform W46, and the gate voltage of the drive transistor 13 becomes the L state. Accordingly, the drive transistor 13 maintains the OFF state.

Next, when the voltage of the feeding coil 11 decreases to be lower than the threshold voltage Vth at the time T25, similarly to the above-mentioned time T21, the ON signal generation section 80 outputs the open state to the output signal Q1, and the control transistor 87 becomes the OFF state. As a result, the gate voltage of the drive transistor 13 becomes the H state, and the drive transistor 13 becomes the ON state again.

The subsequent operation of the power feeding device 1*a* at the time T26 is the same as the above-mentioned operation at the time T23.

Note that, the example of FIG. 15 shows the operation in the case where no abrupt load variation occurs in the power receiving device 2, for example, and hence the operation transitions to the ton period before the toff period reaches the toffMAX period. Thus, the OFF signal generation section 90 maintains the output signal Q2 to the L state, and does not output the H state.

Figure 16:
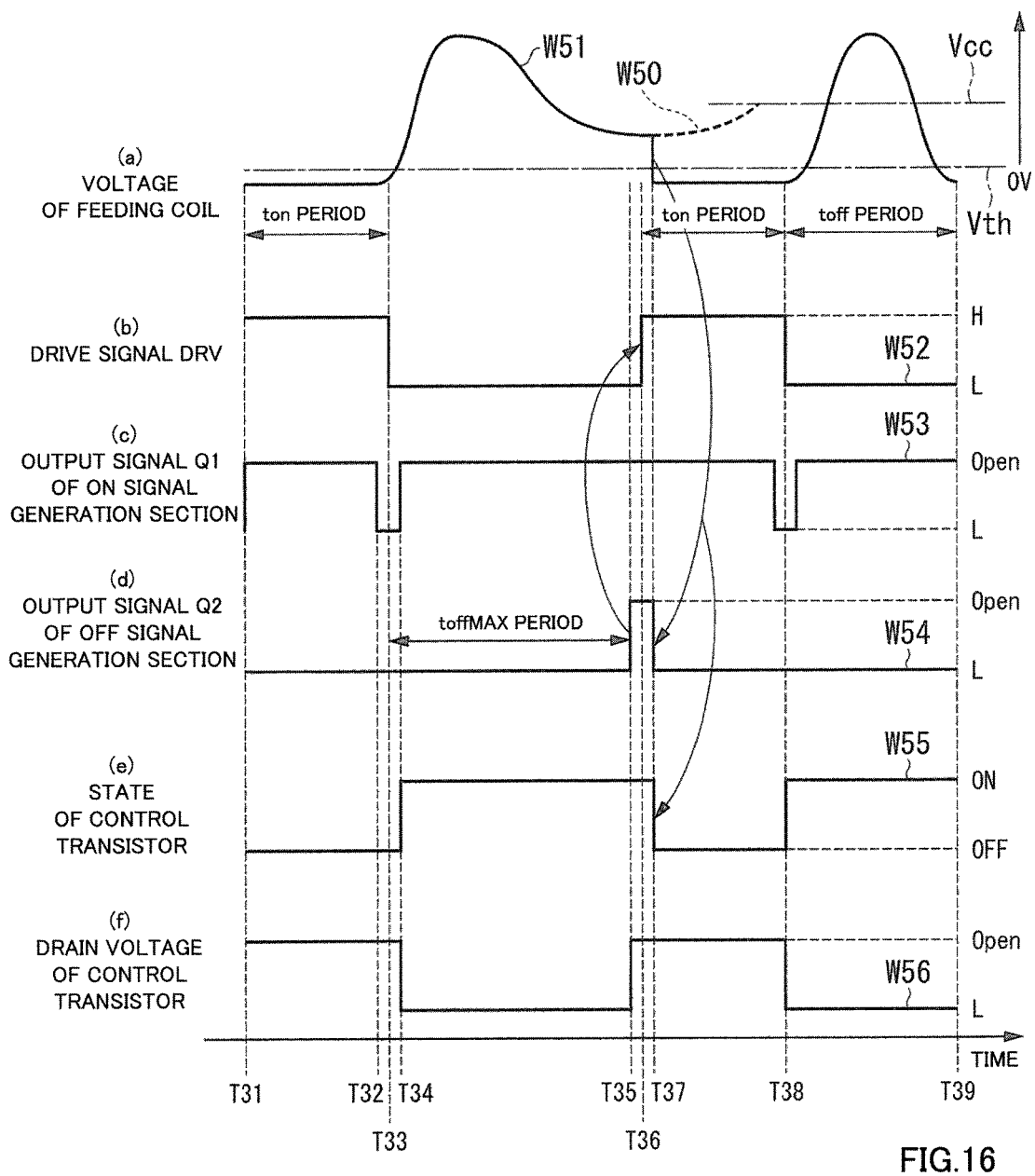
FIG. 16 is a timing chart showing another example of the operation of the drive signal generation section according to the second embodiment.

FIG. 16 is a timing chart showing another example of the operation of the power feeding device 1*a* according to this embodiment. Note that, the timing chart of FIG. 16 shows an example of the operation of the power feeding device 1*a* when an abrupt load variation occurs in the power receiving device 2.

Referring to FIG. 16, waveforms W51 to W56 represent, in order from the top, the waveforms of (a) the voltage of the feeding coil 11 (voltage of the node N1), (b) the drive signal DRV, (c) the output signal Q1 of the ON signal generation section 80, (d) the output signal Q2 of the OFF signal generation section 90, (e) the state of the control transistor 87, and (f) the drain voltage of the control transistor 87. For comparison, a waveform W50 represents the waveform of the voltage of the feeding coil 11 (voltage of the node N1) measured when the OFF signal generation section 90 is not provided.

Note that, the vertical axis represents the voltage for the waveform (a), the conductive (ON)/non-conductive (OFF) state for the waveform (e), and the logic state for the waveforms (b) to (d) and (f). The horizontal axis represents time. A voltage Vth is a threshold voltage for operating the ON signal generation section 80 and the OFF signal generation section 90.

In FIG. 16, the period from a time T31 to a time T33 and the period from a time T36 to a time T38 each correspond to the ton period. The period from the time T38 to a time T39 corresponds to the toff period.

The operation from the time T31 to the time T34 is the same as the operation from the time T21 to the time T24 of FIG. 15.

When an abrupt load variation occurs in the power receiving device 2 in the period between the time T34 and the time T35, the voltage of the feeding coil 11 has the voltage waveform as indicated by the waveform W50. The reason is that the consumption of magnetic energy of the feeding coil 11 varies due to the occurrence of the abrupt load variation in the power receiving device 2. As a result, the voltage of the feeding coil 11 cannot decrease to 0 V but approaches the voltage Vcc of the power supply VCC.

However, the power feeding device 1*a* according to this embodiment includes the OFF signal generation section 90, and hence at the time T35 after the lapse of the toffMAX period, the voltage of the node N20 of the OFF signal generation section 90 is charged by the capacitor 94 to become the H state. As a result, the open collector output buffer 95 outputs the open state to the output signal Q2. In this case, the output signal Q1 of the ON signal generation section 80 is also in the open state, and hence the node N2 becomes the H state due to the voltage supplied from the power supply VCC via the resistor 86.

In this manner, the gate voltage of the drive transistor 13 becomes the H state, and hence the drive transistor 13 becomes the ON state at the time T36.

Then, the voltage of the feeding coil 11 decreases to be lower than the threshold voltage Vth, and hence at the time T37, the ON signal generation section 80 starts the ton period again. In other words, the ON signal generation section 80 outputs a control signal for setting the drive transistor 13 to the ON state to the gate terminal of the drive transistor 13 during the period from the time T37 to the time T38.

In this manner, the drive signal generation section 30*a* switches the drive transistor 13 in synchronization with the rise of the voltage of the feeding coil 11, to thereby continue the oscillation indicated by the waveform W51.

As described above, in the power feeding system 100*a* according to this embodiment, the drive signal generation section 30*a* of the power feeding device 1*a* includes the ON signal generation section 80 (first signal generation section) and the OFF signal generation section 90 (second signal generation section). When the excited voltage of the feeding coil 11 falls within the predetermined threshold range, the ON signal generation section 80 generates the drive signal DRV for setting the drive transistor 13 to the conductive state for the predefined ton period (third period) and thereafter setting the drive transistor 13 to the non-conductive state. Then, when the excited voltage becomes out of the predetermined threshold range, the OFF signal generation section 90 generates the drive signal DRV for setting the drive transistor 13 to the conductive state after the lapse of the predefined toffMAX period (fourth period).

In this manner, the power feeding system 100*a* according to this embodiment is capable of performing oscillation only with the feeding coil 11 without using any feedback coil.

Consequently, the configuration of the power feeding device 1a can be simplified to save the space (downsizing) and reduce the weight.

The power feeding system 100a according to this embodiment includes the OFF signal generation section 90, and hence the oscillation can be stably restarted even when, for example, an abrupt load variation has occurred in the power receiving device 2 or the driving of the feeding coil 11 has been stopped due to the intermittent driving.

The power feeding system 100a according to this embodiment switches the drive transistor 13 when the potential difference across the drive transistor 13 (between the source terminal and the drain terminal) is around 0 V. In this manner, because a change in potential across the drive transistor 13 (between the source terminal and the drain terminal) is small in the switching, the power feeding system 100a according to this embodiment is capable of reducing heat generation of the feeding coil 11 and the drive transistor 13.

Next, a third embodiment of the present invention is described with reference to the drawings.

The periodic waveform variation in the excited voltage of the feeding coil 11 includes a variation in peak voltage of the excited voltage. In this embodiment, a description is given of an example in which the periodic waveform variation in the excited voltage of the feeding coil 11 is detected as a variation in pulse width of the excited voltage.

Third Embodiment

Figure 17:
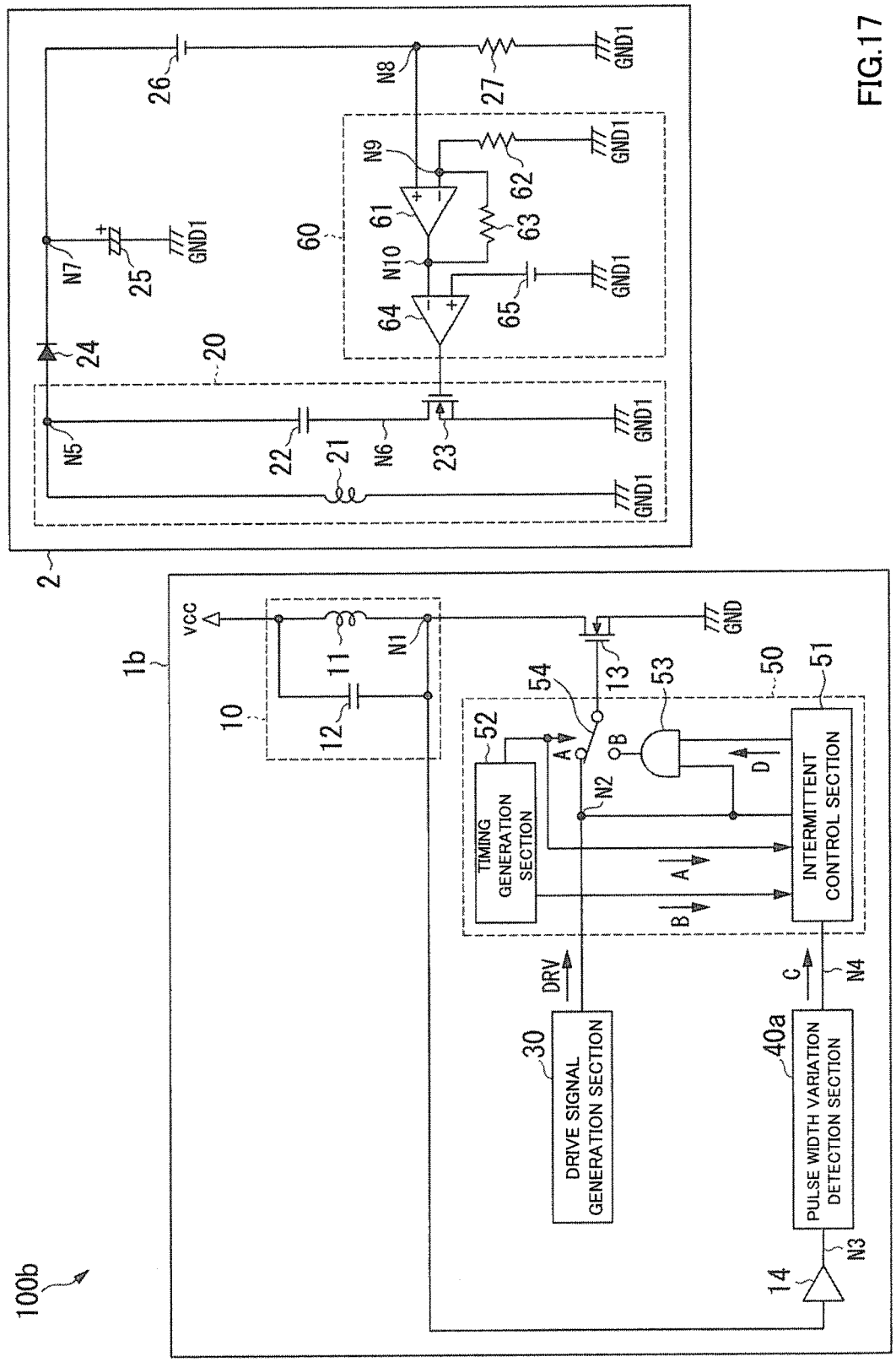
FIG. 17 is a block diagram illustrating an example of a power feeding system according to a third embodiment of the present invention.

FIG. 17 is a block diagram illustrating an example of a power feeding system 100b according to the third embodiment of the present invention.

Referring to FIG. 17, the power feeding system 100b includes a power feeding device 1b and a power receiving device 2.

The power feeding device 1b includes a feeding coil 11, a resonant capacitor 12, a drive transistor 13, a buffer 14, a drive signal generation section 30, a pulse width variation detection section 40a, and a drive control section 50.

Note that, in FIG. 17, the same configuration as that of FIG. 1 is denoted by the same reference symbol, and its description is omitted.

This embodiment differs from the first embodiment in that the power feeding device 1b includes the pulse width variation detection section 40a instead of the crest value variation detection section 40. This different configuration from the first embodiment is now described.

<Configuration of Pulse Width Variation Detection Section 40a>

The pulse width variation detection section 40a (variation detection section) detects a change in resonant state of the resonant circuit 20 of the power receiving device 2, which occurs in accordance with the connection state of the resonant capacitor 22 of the power receiving device 2, as a variation in pulse width of a voltage excited in the feeding coil 11. Note that, the drive control section 50 according to this embodiment determines whether or not electric power can be supplied to the power receiving device 2 based on the variation in pulse width detected by the pulse width variation detection section 40a.

Figure 18:
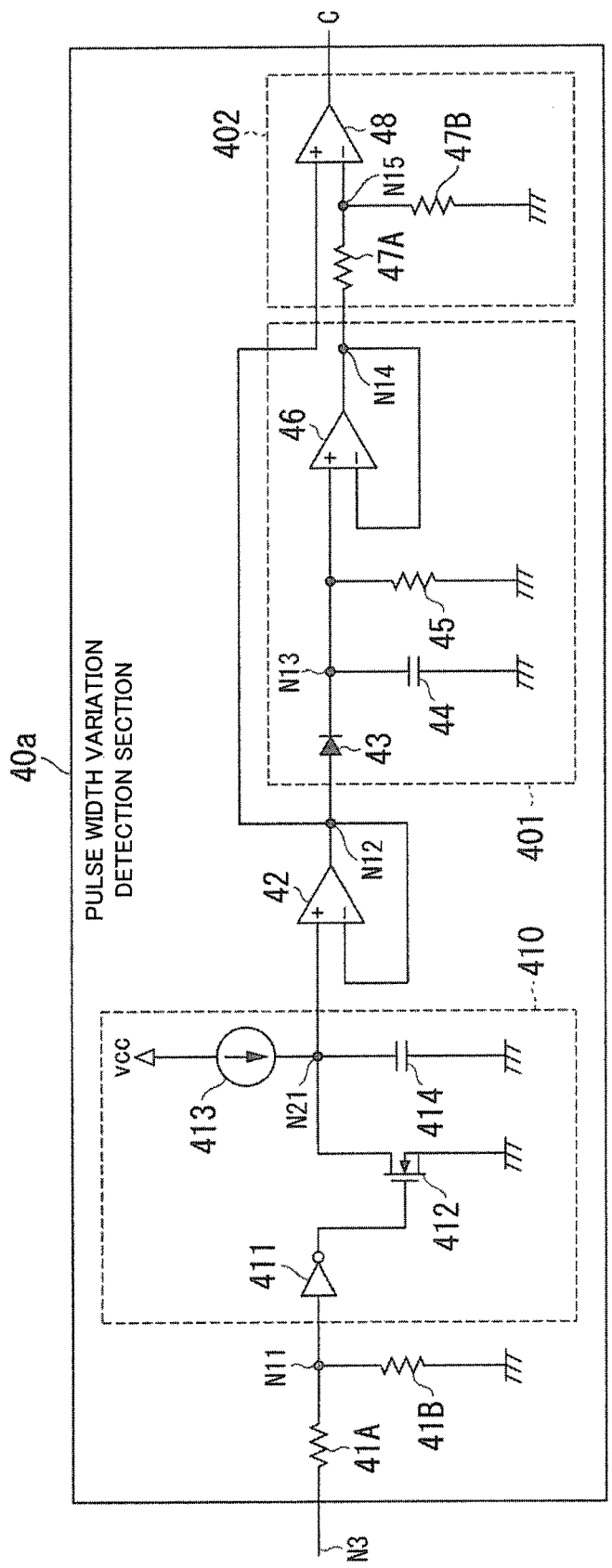
FIG. 18 is a block diagram illustrating an example of a pulse width variation detection section according to the third embodiment.

FIG. 18 is a block diagram illustrating an example of the pulse width variation detection section 40a according to this embodiment.

Referring to FIG. 18, the pulse width variation detection section 40a includes resistors (41A, 41B), an operational amplifier 42, a pulse width voltage conversion circuit 410, a peak hold circuit 401, and a variation detection circuit 402.

Note that, in FIG. 18, the same configuration as that of FIG. 2 is denoted by the same reference symbol, and its description is omitted.

The pulse width variation detection section 40a differs from the crest value variation detection section 40 illustrated in FIG. 2 in that the pulse width voltage conversion circuit 410 is added.

The pulse width voltage conversion circuit 410 is arranged between the node N11 and the positive input terminal of the operational amplifier 42, and converts a variation in pulse width of a periodic waveform of the voltage excited in the feeding coil 11 as a voltage variation. The pulse width voltage conversion circuit 410 includes an inverter 411, an NMOS transistor 412, a constant current source 413, and a capacitor 414.

The inverter 411 has an input terminal connected to the node N11 and an output terminal connected to a gate terminal of the NMOS transistor 412. The inverter 411 outputs a signal obtained by logically inverting the voltage of the node N11 to a node N21. The inverter 411 sets the NMOS transistor 412 to the OFF state (non-conductive state) when the node N11 is in the H state, and sets the NMOS transistor 412 to the ON state (conductive state) when the node N11 is in the L state. In other words, the inverter 411 sets the NMOS transistor 412 to the OFF state in the period during which the node N11 is in the H state.

The NMOS transistor 412 has a source terminal connected to the power supply GND, the gate terminal connected to an output signal line of the inverter 411, and a drain terminal connected to the node N21. The NMOS transistor 412 controls charge and discharge to and from the capacitor 414 with the constant current source 413.

The constant current source 413 is connected between the node N21 and the power supply VCC, and supplies a predetermined constant current to the node N21 from the power supply VCC.

The capacitor 414 is connected between the node N21 and the power supply GND, and is charged with a predetermined constant current from the constant current source 413, to thereby convert the period during which the node N11 is in the H state into the voltage of the node N21.

The node N21 is connected to the operational amplifier 42, and the downstream peak hold circuit 401 and variation detection circuit 402 construct a crest value variation detection circuit similar to the crest value variation detection section 40.

In this manner, the pulse width variation detection section 40a includes the pulse width voltage conversion circuit 410 for converting the period during which the node N11 is in the H state (pulse width of the voltage of the node N11) into a voltage value, and the output of the pulse width voltage conversion circuit 410 is used as the input of the crest value variation detection circuit constructed by the downstream peak hold circuit 401 and variation detection circuit 402.

Next, the operation of the power feeding system 100b according to this embodiment is described with reference to the drawing.

In this embodiment, the operation of the power receiving device 2 is the same as in the first embodiment, and hence its description is herein omitted.

The operation of the pulse width variation detection section 40a is now described with reference to FIG. 19.

Figure 19:
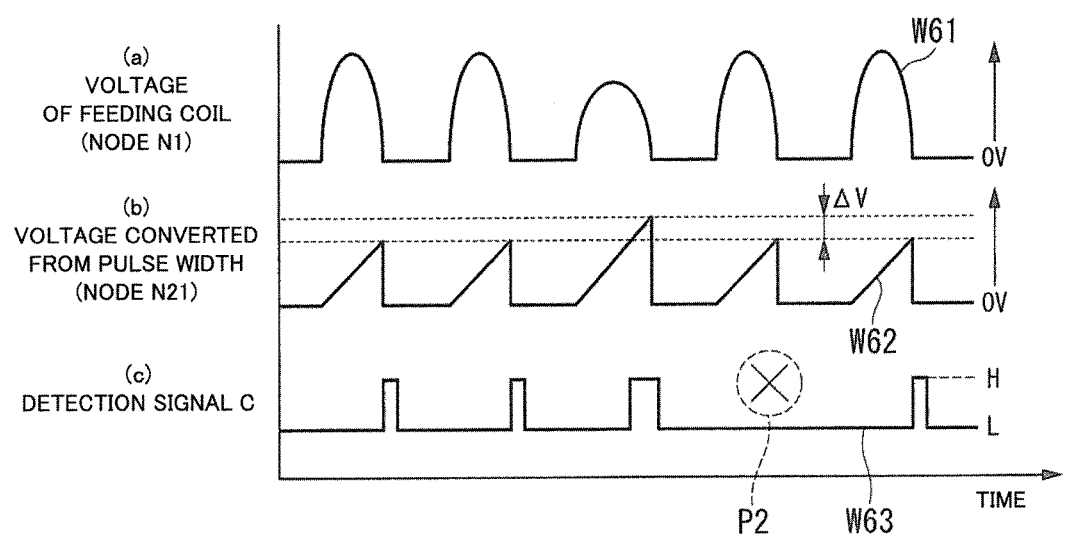
FIG. 19 is a graph showing an example of the voltage of the feeding coil and a detection signal of the pulse width variation detection section in the case where electric power can be supplied to the power receiving device.

FIG. 19 is a graph showing an example of a voltage of the feeding coil 11 and a detection signal C of the pulse width variation detection section 40a in the case where electric power can be supplied to the power receiving device 2.

Referring to FIG. 19, waveforms W61 to W63 represent, in order from the top, the waveforms of (a) the voltage of the feeding coil 11 (voltage of the node N1), (b) the voltage converted from the pulse width (voltage of the node N21), and (c) the detection signal C of the pulse width variation detection section 40a. Note that, the vertical axis represents the voltage for the waveforms (a) and (b) and the logic state for the waveform (c). The horizontal axis represents time.

The example of FIG. 19 shows the case where electric power can be supplied to the power receiving device 2, and the resonant circuit 20 of the power receiving device 2 is switched between the resonant state and the non-resonant state. Accordingly, as indicated by the waveform W61, the peak voltage of the voltage of the feeding coil 11 varies, and the pulse width also varies.

For example, the pulse width in the waveform W61 becomes larger at a position at which the peak voltage is low, and hence a variation in peak voltage (change in peak voltage difference ΔV) occurs in the waveform W62 between a pulse having a low peak voltage and a subsequent pulse. As a result, as indicated by the waveform W63, the pulse width variation detection section 40a does not output a pulse signal as the detection signal C at a point P2 because of the variation in pulse width.

In the case where electric power cannot be supplied to the power receiving device 2, the pulse width does not vary in the periodic voltage waveform of the feeding coil 11. Accordingly, the pulse width variation detection section 40a does not enter the above-mentioned state in which a pulse signal is not output as the detection signal C as indicated by the point P2 of the waveform W63, but continuously outputs the pulse signal as the detection signal C.

In this manner, the power feeding device 1b according to this embodiment is capable of determining whether or not electric power can be received by the power receiving device 2 based on the variation in pulse width of the periodic waveform of the voltage of the feeding coil 11, and switches between continuous driving and intermittent driving of the feeding coil 11 based on the result of the determination.

The operation of the power feeding device 1b according to this embodiment is the same as in the first embodiment illustrated in FIG. 6. Note that, in this embodiment, in Step S204 of FIG. 6, the intermittent control section 51 determines whether or not the pulse width varies instead of determining whether or not the peak voltage varies.

As described above, the power feeding device 1b according to this embodiment includes the pulse width variation detection section 40a (variation detection section). Note that, the periodic waveform variation in the excited voltage of the feeding coil 11 includes the variation in pulse width of the excited voltage, and the pulse width variation detection section 40a detects the change in electrical connection state of the resonant capacitor 22 as the variation in pulse width. Then, the drive control section 50 determines whether or not electric power can be supplied to the power receiving device 2 based on the variation in pulse width detected by the pulse width variation detection section 40a.

In this manner, similarly to the first and second embodiments, the power feeding system 100b according to this embodiment is capable of accurately determining whether or not electric power can be supplied to the power receiving device 2. Consequently, the power feeding system 100b according to this embodiment has the same effects as in the first and second embodiments.

Note that, the present invention is not limited to each of the above-mentioned embodiments, and may be changed within the scope not departing from the concept of the present invention.

For example, in each of the above-mentioned embodiments, the power feeding system 100 (100a, 100b) supplies electric power for charging the battery 26 of the power receiving device 2 as an example, but the present invention is not limited thereto. For example, the power feeding system 100 (100a, 100b) may supply electric power for operating the power receiving device 2 or a device connected to the power receiving device 2.

In each of the above-mentioned embodiments, each of the above-mentioned embodiments is carried out alone, but the embodiments may be carried out in combination.

In each of the above-mentioned embodiments, the periodic waveform variation in the excited voltage of the feeding coil 11 includes the variation in peak voltage of the excited voltage and the variation in pulse width of the excited voltage, but may include, for example, a variation in frequency of the waveform of the excited voltage, a variation in cycle of the waveform of the excited voltage, and the like. In other words, the variation detection section may detect the change in electrical connection state of the resonant capacitor 22 as the variation in frequency of the waveform of the excited voltage or the variation in cycle of the waveform of the excited voltage, and the drive control section 50 may determine whether or not electric power can be supplied to the power receiving device 2 based on the variation in frequency of the waveform of the excited voltage or the variation in cycle of the waveform of the excited voltage detected by the variation detection section.

In each of the above-mentioned embodiments, the resonance control section 60 controls the resonant state in accordance with the charge current of the battery 26, but the present invention is not limited thereto. For example, the resonance control section 60 may control the resonant state in accordance with a charge voltage of the battery 26.

Each configuration included in the power feeding system 100 (100a, 100b) may be implemented by dedicated hardware. Each configuration included in the power feeding system 100 (100a, 100b) may be constructed by a memory and a CPU, and its functions may be implemented by loading a program for implementing each configuration included in the power feeding system 100 (100a, 100b) onto the memory and executing the program.

What is claimed is:

1. A power feeding system, comprising a power feeding device comprising a feeding coil and a power receiving device comprising a receiving coil, for supplying electric power from the power feeding device to the power receiving device via electromagnetic induction,
the power receiving device comprising a resonant circuit,
the resonant circuit comprising:
the receiving coil to be supplied with electric power from the feeding coil;
a resonant capacitor configured to resonate with the receiving coil; and
a first switching element configured to change an electrical connection state of the resonant capacitor to control a resonant state of the resonant circuit,
the power feeding device comprising:
a second switching element connected in series to the feeding coil;
a drive signal generation section configured to generate a drive signal for driving the feeding coil by changing a state of the second switching element between a conductive state and a non-conductive state;

a variation detection section configured to detect the change in the electrical connection state of the resonant capacitor as a periodic waveform variation in a voltage excited in the feeding coil; and a drive control section configured to determine whether or not electric power is suppliable to the power receiving device based on the periodic waveform variation detected by the variation detection section, and control whether or not to continuously supply the drive signal to the second switching element based on a result of the determination.

2. A power feeding system according to claim 1, wherein the drive control section is configured to:

supply the drive signal to the second switching element in a predefined first period, to thereby cause the variation detection section to detect the periodic waveform variation;

continue, when it is determined in the first period that electric power is suppliable to the power receiving device, the supply of the drive signal to the second switching element in a predefined second period after the predefined first period, to thereby continuously drive the feeding coil; and stop, when it is determined in the first period that electric power is not suppliable to the power receiving device, the supply of the drive signal to the second switching element in the second period, to thereby intermittently drive the feeding coil.

3. A power feeding system according to claim 2, wherein the drive control section comprises a timing generation section configured to generate the first period and the second period alternately and regularly.

4. A power feeding system according to claim 2, wherein the second period is defined to be longer than the first period so that an increased temperature of a foreign object caused by heat generation when the feeding coil and the foreign object are electromagnetically coupled to each other becomes a predetermined temperature or less.

5. A power feeding system according to claim 3, wherein the second period is defined to be longer than the first period so that an increased temperature of a foreign object caused by heat generation when the feeding coil and the foreign object are electromagnetically coupled to each other becomes a predetermined temperature or less.

6. A power feeding system according to claim 1, wherein:
the periodic waveform variation comprises a variation in peak voltage of the excited voltage;
the variation detection section detects the change in the electrical connection state of the resonant capacitor as the variation in the peak voltage; and
the drive control section determines whether or not electric power is suppliable to the power receiving device based on the variation in the peak voltage detected by the variation detection section.

7. A power feeding system according to claim 2, wherein:
the periodic waveform variation comprises a variation in peak voltage of the excited voltage;
the variation detection section detects the change in the electrical connection state of the resonant capacitor as the variation in the peak voltage; and
the drive control section determines whether or not electric power is suppliable to the power receiving device based on the variation in the peak voltage detected by the variation detection section.

8. A power feeding system according to claim 3, wherein:
the periodic waveform variation comprises a variation in peak voltage of the excited voltage;
the variation detection section detects the change in the electrical connection state of the resonant capacitor as the variation in the peak voltage; and
the drive control section determines whether or not electric power is suppliable to the power receiving device based on the variation in the peak voltage detected by the variation detection section.

9. A power feeding system according to claim 6, wherein the variation detection section comprises:
a peak hold circuit configured to hold the peak voltage of the excited voltage; and
a detection circuit configured to detect the variation in the peak voltage based on a voltage held by the peak hold circuit and the peak voltage of the excited voltage.

10. A power feeding system according to claim 7, wherein the variation detection section comprises:
a peak hold circuit configured to hold the peak voltage of the excited voltage; and
a detection circuit configured to detect the variation in the peak voltage based on a voltage held by the peak hold circuit and the peak voltage of the excited voltage.

11. A power feeding system according to claim 8, wherein the variation detection section comprises:
a peak hold circuit configured to hold the peak voltage of the excited voltage; and
a detection circuit configured to detect the variation in the peak voltage based on a voltage held by the peak hold circuit and the peak voltage of the excited voltage.

12. A power feeding system according to claim 1, wherein:
the periodic waveform variation comprises a variation in pulse width of the excited voltage;
the variation detection section detects the change in the electrical connection state of the resonant capacitor as the variation in the pulse width; and
the drive control section determines whether or not electric power is suppliable to the power receiving device based on the variation in the pulse width detected by the variation detection section.

13. A power feeding system according to claim 2, wherein:
the periodic waveform variation comprises a variation in pulse width of the excited voltage;
the variation detection section detects the change in the electrical connection state of the resonant capacitor as the variation in the pulse width; and
the drive control section determines whether or not electric power is suppliable to the power receiving device based on the variation in the pulse width detected by the variation detection section.

14. A power feeding system according to claim 3, wherein:
the periodic waveform variation comprises a variation in pulse width of the excited voltage;
the variation detection section detects the change in the electrical connection state of the resonant capacitor as the variation in the pulse width; and
the drive control section determines whether or not electric power is suppliable to the power receiving device based on the variation in the pulse width detected by the variation detection section.

15. A power feeding system according to claim 1, wherein the power receiving device further comprises a resonance control section configured to control the first switching element to control the resonant state of the resonant circuit, the resonance control section being configured to control the first switching element in accordance with a current flowing into a battery that is charged with DC electric power obtained by rectifying electric power received by the receiving coil.

16. A power feeding system according to claim 1, wherein the drive signal generation section comprises:
   a first signal generation section configured to generate the drive signal for setting, when the excited voltage falls within a predetermined threshold range, the second switching element to the conductive state in a predefined third period and thereafter setting the second switching element to the non-conductive state; and
   a second signal generation section configured to generate the drive signal for setting, when the excited voltage becomes out of the predetermined threshold range, the second switching element to the conductive state after a lapse of a predefined fourth period.

17. A power feeding device for a power feeding system, for supplying electric power to a power receiving device via electromagnetic induction,
   the power receiving device comprising a resonant circuit, the resonant circuit comprising: a receiving coil to be supplied with electric power from a feeding coil comprised in the power feeding device; a resonant capacitor configured to resonate with the receiving coil; and a first switching element configured to change a connection state of the resonant capacitor to control a resonant state of the resonant circuit,
   the power feeding device comprising:
   a second switching element connected in series to the feeding coil;
   a drive signal generation section configured to generate a drive signal for driving the feeding coil by changing a state of the second switching element between a conductive state and a non-conductive state;
   a variation detection section configured to detect a change in the resonant state of the resonant circuit, which occurs in accordance with the connection state of the resonant capacitor, as a periodic waveform variation in a voltage excited in the feeding coil; and
   a drive control section configured to determine whether or not electric power is suppliable to the power receiving device based on the periodic waveform variation detected by the variation detection section, and control whether or not to continuously supply the drive signal to the second switching element based on a result of the determination.

18. A power feeding method for a power feeding system configured to supply electric power from a power feeding device to a power receiving device via electromagnetic induction,
   the power feeding device comprising: a feeding coil; and
   a drive signal generation section configured to generate a drive signal for driving the feeding coil by changing a state of a second switching element connected in series to the feeding coil between a conductive state and a non-conductive state,
   the power receiving device comprising a receiving coil, the power feeding method comprising:
   varying, by the power receiving device, a resonant state of a resonant circuit,
   the resonant circuit comprising the receiving coil to be supplied with electric power from the feeding coil, a resonant capacitor configured to resonate with the receiving coil, and a first switching element configured to change a connection state of the resonant capacitor to control the resonant state of the resonant circuit;
   detecting, by the power feeding device, a change in the resonant state of the resonant circuit, which occurs in accordance with the connection state of the resonant capacitor, as a periodic waveform variation in a voltage excited in the feeding coil; and
   determining, by the power feeding device, whether or not electric power is suppliable to the power receiving device based on the periodic waveform variation detected in the detecting, and controlling, by the power feeding device, whether or not to continuously supply the drive signal to the second switching element based on a result of the determination.

* * * * *